US009939754B2

(12) United States Patent
Haruta

(10) Patent No.: US 9,939,754 B2
(45) Date of Patent: Apr. 10, 2018

(54) IMAGE FORMING APPARATUS THAT CORRECTS A WIDTH OF A FINE LINE, IMAGE FORMING METHOD, AND RECORDING MEDIUM

(71) Applicant: CANON KABUSHIKI KAISHA, Tokyo (JP)

(72) Inventor: Kenichirou Haruta, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 27 days.

(21) Appl. No.: 15/063,298

(22) Filed: Mar. 7, 2016

(65) Prior Publication Data

US 2016/0266512 A1 Sep. 15, 2016

(30) Foreign Application Priority Data

Mar. 10, 2015 (JP) ................................ 2015-047632

(51) Int. Cl.
*H04N 1/409* (2006.01)
*G03G 15/043* (2006.01)

(52) U.S. Cl.
CPC .................................. *G03G 15/043* (2013.01)

(58) Field of Classification Search
None
See application file for complete search history.

(56) References Cited

U.S. PATENT DOCUMENTS 7,164,504 B1 * 1/2007 Yamazaki .......... H04N 1/40075 358/3.08
7,539,351 B2 * 5/2009 Xu ...................... H04N 1/4092 382/256
7,586,650 B2 * 9/2009 Washio ................ H04N 1/4092 358/3.06
7,627,192 B2 * 12/2009 Yokochi ............. H04N 1/40062 358/3.27
8,223,392 B2 * 7/2012 Yokochi ............... H04N 1/4092 358/1.9
8,687,240 B2 * 4/2014 Fukamachi ............ H04N 1/405 347/131
8,976,408 B2 * 3/2015 Kobayashi ......... G06K 15/1872 358/1.2

FOREIGN PATENT DOCUMENTS

JP 2013-125996 A 6/2013

* cited by examiner

*Primary Examiner* — Paul F Payer
(74) *Attorney, Agent, or Firm* — Canon U.S.A., Inc. IP Division

(57) ABSTRACT

Density values of two non-fine line parts that sandwich a specified fine line part in image data are corrected to density values lower than a density value of the fine line part based on the density value of the specified fine line part.

26 Claims, 21 Drawing Sheets

IMAGE FORMING APPARATUS THAT CORRECTS A WIDTH OF A FINE LINE, IMAGE FORMING METHOD, AND RECORDING MEDIUM

BACKGROUND OF THE INVENTION

Field of the Invention

The present invention relates to a technology for correcting image data including a fine line.

Description of the Related Art

While a printing resolution increased, a printing apparatus is being able to print image objects having a narrow width such as, for example, a fine line (thin line) and a small point character (hereinafter, will be simply collectively referred to as “fine lines”). It may be difficult for a user to visibly recognize the above-described fine lines depending on a state of the printing apparatus in some cases. Japanese Patent Laid-Open No. 2013-125996 discloses a technology for thickening a width of a fine line to improve visibility. For example, a fine line having a one-pixel width is corrected to a fine line having a three-pixel width while pixels are added to both sides of the fine line.

SUMMARY OF THE INVENTION

According to an aspect of the present invention, there is provided an image forming apparatus including: an obtaining unit configured to obtain image data; a specification unit configured to specify a fine line part in the image data; a correction unit configured to correct a density value of the fine line part and a density value of a non-fine line part adjacent to the fine line part such that a combined potential formed on a photosensitive member by an exposure spot with respect to the fine line part and an exposure spot with respect to the non-fine line part becomes a predetermined combined potential; an exposure unit configured to expose the photosensitive member based on the image data in which the density values of the fine line part and the non-fine line part has been corrected, in which the exposure spot with respect to the fine line part and the exposure spot with respect to the non-fine line part are overlapped with each other; and an image forming unit configured to form an image on the exposed photosensitive member by developing agent adhering on the exposed photosensitive member according to a potential on the exposed photosensitive member formed by the exposure unit.

Further features of the present invention will become apparent from the following description of exemplary embodiments with reference to the attached drawings.

DESCRIPTION OF THE EMBODIMENTS

Hereinafter, exemplary embodiments of the present invention will be described with reference to the drawings, but the present invention is not limited to the following respective exemplary embodiments.

First Exemplary Embodiment

Figure 1:
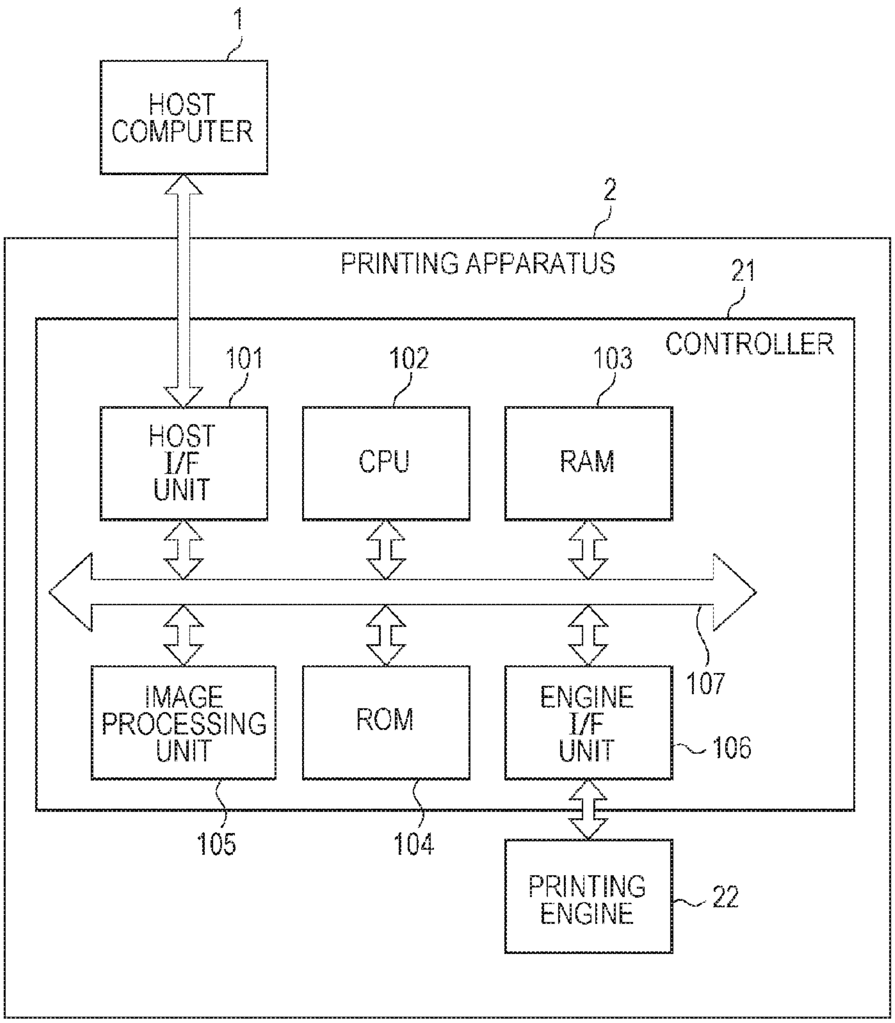
FIG. 1 is a block diagram illustrating a functional configuration of a controller according to a first exemplary embodiment.

FIG. 1 is a schematic diagram of a system configuration according to the present exemplary embodiment.

An image processing system illustrated in FIG. 1 is constituted by a host computer 1 and a printing apparatus 2. The printing apparatus 2 according to the present exemplary embodiment is an example image forming apparatus and is provided with a controller 21 and a printing engine 22.

The host computer 1 is a computer such as a general personal computer (PC) or a work station (WS). An image or document created by software application such as a printer driver, which is not illustrated in the drawing, on the host computer 1 is transmitted as PDL data to the printing apparatus 2 via a network (for example, a local area network). In the printing apparatus 2, the controller 21 receives the transmitted PDL data. The PDL stands for a page description language.

The controller 21 is connected to the printing engine 22. The controller 21 receives the PDL data from the host computer 1 and converts it into print data that can be processed in the printing engine 22 and outputs the print data to the printing engine 22.

The printing engine 22 prints an image on the basis of the print data output by the controller 21. The printing engine 22 according to the present exemplary embodiment is a printing engine of an electrophotographic method.

Next, a detail of the controller 21 will be described. The controller 21 includes a host interface (I/F) unit 101, a CPU 102, a RAM 103, the ROM 104, an image processing unit 105, an engine I/F unit 106, and an internal bus 107.

The host I/F unit 101 is an interface configured to receive the PDL data transmitted from the host computer 1. For example, the host I/F unit 101 is constituted by Ethernet (registered trademark), a serial interface, or a parallel interface.

The CPU 102 performs a control on the entire printing apparatus 2 by using programs and data stored in the RAM 103 and the ROM 104 and also executes processing performed by the controller 21 which will be described below.

The RAM 103 is provided with a work area used when the CPU 102 executes various processings.

The ROM 104 stores the programs and data for causing the CPU 102 to execute various processings which will be described below, setting data of the controller 21, and the like.

The image processing unit 105 performs printing image processing on the PDL data received by the host I/F unit 101 in accordance with the setting from the CPU 102 to generate print data that can be processed in the printing engine 22. The image processing unit 105 performs rasterizing processing particularly on the received PDL data to generate image data having a plurality of color components per pixel. The plurality of color components refer to independent color components in a gray scale or a color space such as RGB (red, green, and blue). The image data has an 8-bit value per color component for each pixel (256 gradations (tones)). That is, the image data is multi-value bitmap data including multi-value pixels. In the above-described rasterizing processing, attribute data indicating an attribute of the pixel of the image data for each pixel is also generated in addition to the image data. This attribute data indicates which type of object the pixel belongs to and holds a value indicating a type of the object such as, for example, character, line, figure, or image as an attribute of the image. The image processing unit 105 applies image processing which will be described below to the generated image data and attribute data to generate print data.

The engine I/F unit 106 is an interface configured to transmit the print data generated by the image processing unit 105 to the printing engine 22.

The internal bus 107 is a system bus that connects the above-described respective units to one another.

Figure 2:
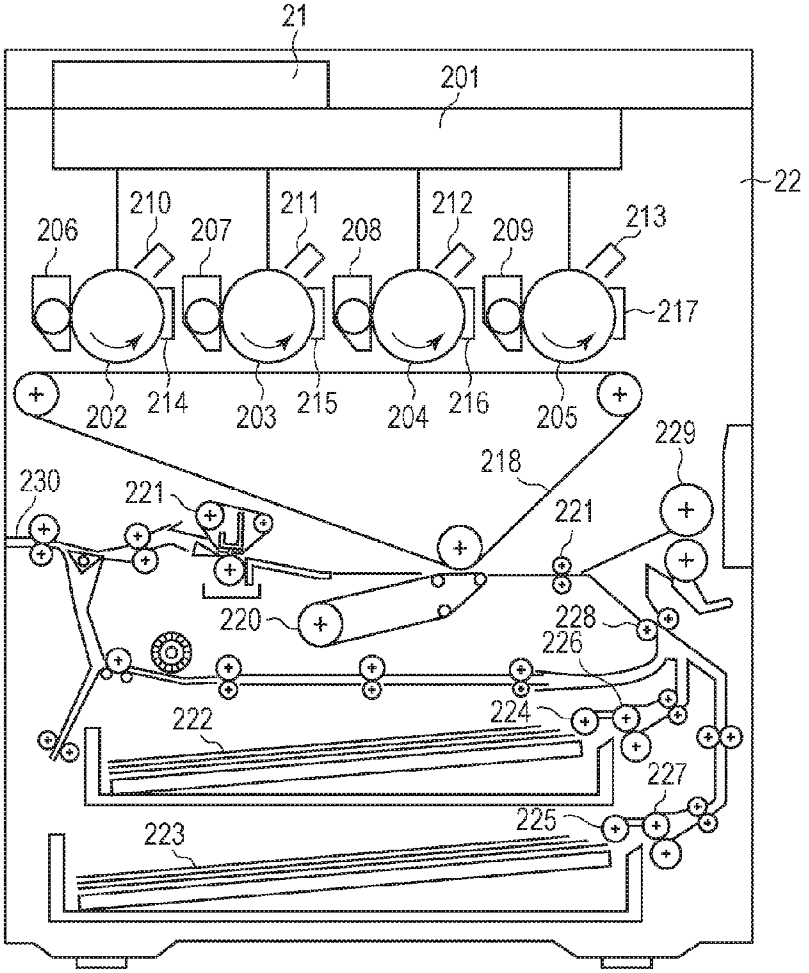
FIG. 2 is a cross sectional diagram illustrating a schematic configuration of an image forming apparatus according to the first exemplary embodiment.

Next, a detail of the printing engine 22 will be described with reference to FIG. 2. The printing engine 22 is of the electrophotographic method and has the configuration as illustrated in FIG. 2. That is, when a charged photosensitive member (photosensitive drum) is irradiated with laser beam in which an exposure intensity per unit area is modulated, a developing agent (toner) is adhered to an exposed part, and a toner image (visible image) is formed. A method for the modulation of the exposure intensity includes a related art technique such as a pulse width modulation (PWM). Important aspects herein are the following points. (1) The exposure intensity of the laser beam with respect to one pixel is maximized at the pixel center and attenuates as being away from the pixel center. (2) An exposure range of the laser beam (exposure spot diameter) with respect to one pixel has a partial overlap with an exposure range with respect to an adjacent pixel. Therefore, the final exposure intensity with respect to a certain pixel depends on an accumulation with the exposure intensity of the adjacent pixel. (3) A manner of toner adhesion varies in accordance with the final exposure intensity. For example, when the final exposure intensity with respect to one pixel is intense over the whole range of the pixels, a dense and large pixel image is visualized, and when the final exposure intensity with respect to one pixel is intense only at the pixel center, a dense and small pixel image is visualized. According to the present exemplary embodiment, by performing image processing that will be described below in which the above-described characteristics are taken into account, a dense and thick line and character can be printed. A process up to the printing of the image from the print data will be described below.

Photosensitive drums 202, 203, 204, and 205 functioning as image bearing members are supported about axes thereof and rotated and driven in an arrow direction. The respective photosensitive drums 202 to 205 bear images formed by toner of the respective process colors (for example, yellow, magenta, cyan, and black). Primary chargers 210, 211, 212, and 213, an exposure control unit 201, and development apparatuses 206, 207, 208, and 209 are arranged in the rotation direction so as to face outer circumference surfaces of the photosensitive drums 202 to 205. The primary chargers 210 to 213 charge surfaces of the photosensitive drums 202 to 205 with even negative potentials (for example, −500 V). Subsequently, the exposure control unit 201 modulates the exposure intensity of the laser beam in accordance with the print data transmitted from the controller 21 and irradiates (exposes) the photosensitive drums 202 to 205 with the modulated laser beam. The potential of the photosensitive drum surface at the exposed part is decreased, and the part where the potential is decreased is formed on the photosensitive drum as an electrostatic-latent image. Toner charged to a negative potential stored in the development apparatuses 206 to 209 are adhered to the formed electrostatic-latent image by development bias of the development apparatuses 206 to 209 (for example, −300 V), and a toner image is visualized. This toner image is transferred from each of the photosensitive drums 202 to 205 to an intermediate transfer belt 218 at a position where each of the photosensitive drums 202 to 205 faces the intermediate transfer belt 218. Then, the transferred toner image is further transferred at a position where the intermediate transfer belt 218 faces a transfer belt 220 onto a sheet such as paper conveyed to the position from the intermediate transfer belt 218. Subsequently, fixing processing (heating and pressurization) is performed on the sheet onto which the toner image has been transferred by a fixing unit 221, and the sheet is discharged from a sheet discharge port 230 to the outside of the printing apparatus 2.

Image Processing Unit

Figure 3:
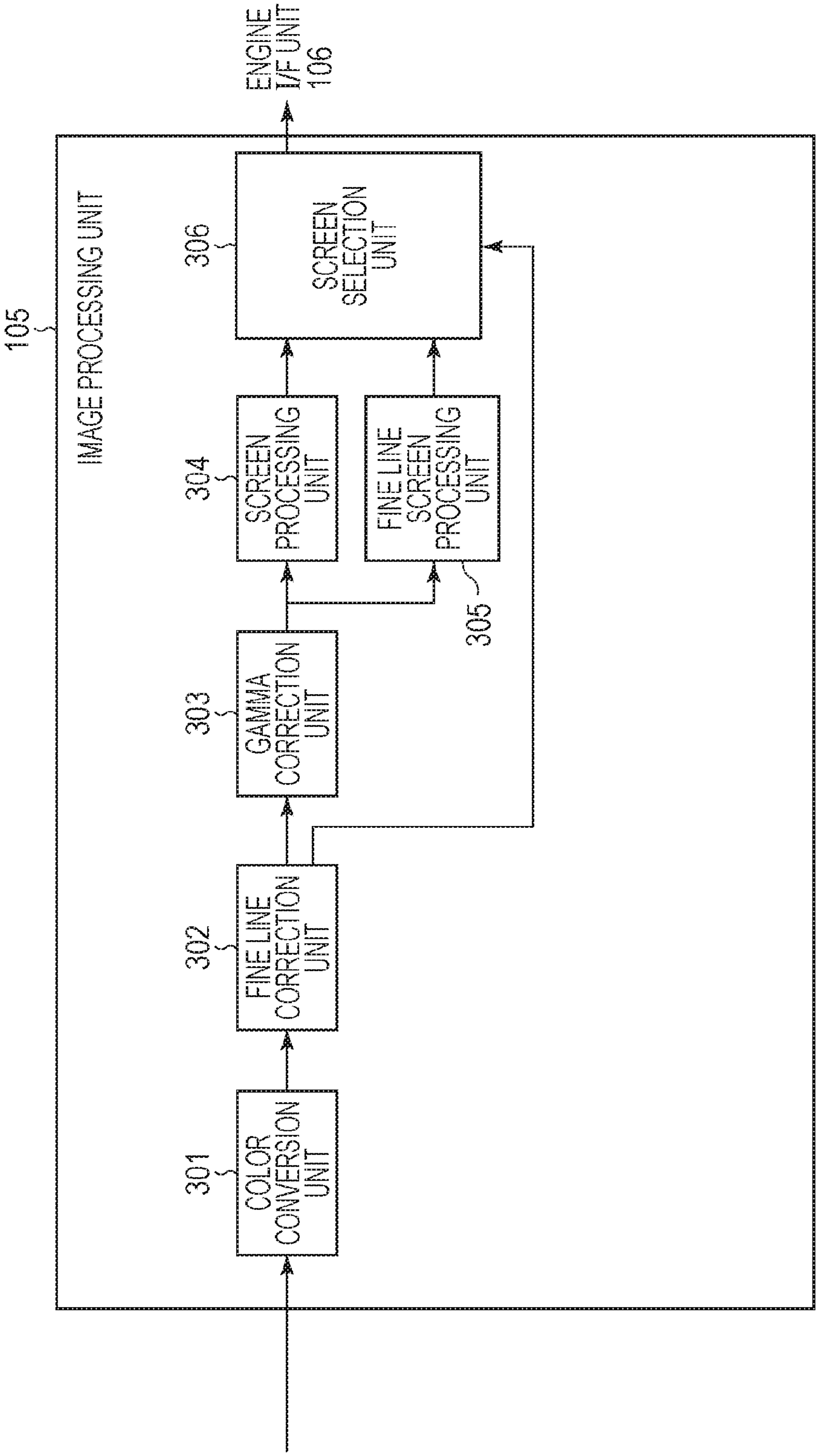
FIG. 3 is a block diagram illustrating an image processing unit according to the first exemplary embodiment.

Next, a detail of the image processing unit 105 will be described. As illustrated in FIG. 3, the image processing unit 105 includes a color conversion unit 301, a fine line correction unit 302, a gamma correction unit 303, a screen processing unit 304, a fine line screen processing unit 305, and a screen selection unit 306. It should be noted that the image processing unit 105 performs the rasterizing processing on the PDL data received by the host I/F unit 101 as described above to generate the multi-value image data. Herein, the printing image processing performed on the generated multi-value image data will be described in detail.

The color conversion unit 301 performs color conversion processing on the multi-value image data from grayscale color space or RGB color space to CMYK color space. Multi-value bitmap image data having an 8-bit multi-value density value (also referred to as a gradation value or a signal value) per color component of one pixel (256 gradations) is generated by the color conversion processing. This image data has respective color components of cyan, magenta, yellow, and black (CMYK) and is also referred to as CMYK image data. This CMYK image data is stored in a buffer that is not illustrated in the drawing in the color conversion unit 301.

The fine line correction unit 302 obtains the CMYK image data stored in the buffer, and first, a fine line part in the image data (that is, a part having a narrow width in an image object) is specified. The fine line correction unit 302 then determines a density value with respect to pixels of the specified fine line part and a density value with respect to pixels of a non-fine line part adjacent to the fine line part on the basis of the density value of the pixels of the fine line part. It should be noted that it is important to determine a total sum of the respective density values with respect to the pixels of the fine line part and the pixels of the non-fine line part (including two non-fine line parts sandwiching the fine line part) on the basis of the density value of the pixels of the fine line part such that the total sum is higher than the density value of the pixels of the fine line part. This is because the image of the fine line part is appropriately printed to be thick and bold. Then, the fine line correction unit 302 corrects the respective density values of the pixels of the fine line part and the pixels of the non-fine line part on the basis of the determined respective density values and outputs the corrected respective density values of the pixels to the gamma correction unit 303. Processing by the fine line correction unit 302 will be described in detail below with reference to FIG. 6.

The fine line correction unit 302 outputs a fine line flag for switching applied screen processings for the pixels constituting the fine line and the other pixels to the screen selection unit 306. This is for the purpose of reducing break or jaggies of the object caused by the screen processing by applying the screen processing for the fine line (flat-type screen processing) to the pixels of the fine line part and the pixels adjacent to the fine line part. Types of the screen processings will be described below with reference to FIGS. 4 and 5.

The gamma correction unit 303 executes gamma correction processing of correcting the input pixel data by using a one-dimensional lookup table such that an appropriate density characteristic when the toner image is transferred onto the sheet is obtained. According to the present exemplary embodiment, a linear-shaped one-dimensional lookup table is used as an example. The lookup table is a lookup table where the input is output as it is. It should be noted however that the CPU 102 may rewrite the one-dimensional lookup table in accordance with a change in the state of the printing engine 22. The pixel data after the gamma correction is input to the screen processing unit 304 and the fine line screen processing unit 305.

The screen processing unit 304 performs concentrated-type screen processing on the input pixel data and outputs the pixel data as the result to the screen selection unit 306.

The fine line screen processing unit 305 performs the flat-type screen processing on the input pixel data as the screen processing for the fine line and outputs the pixel data as the result to the screen selection unit 306.

The screen selection unit 306 selects one of the outputs from the screen processing unit 304 and the fine line screen processing unit 305 in accordance with the fine line flag input from the fine line correction unit 302 and outputs the selected output to the engine I/F unit 106 as the print data.

With Regard to the Respective Screen Processings

Next, with reference to FIGS. 4 and 5, screen processing performed by the screen processing unit 304 and the fine line screen processing unit 305 according to the present exemplary embodiment will be described in detail.

According to the concentrated-type screen processing and the flat-type screen processing, the data is converted from the input 8-bit (256-gradation) pixel data (hereinafter, will be simply referred to as image data) to 4-bit (16-gradation) image data that can be processed by the printing engine 22 in the screen processing. In this conversion, a dither matrix group including 15 dither matrices is used for the conversion to the image data having 16 gradations.

Herein, each of dither matrices is obtained by arranging m×n thresholds having a width m and a height n in a matrix. The number of dither matrices included in the dither matrix group is determined in accordance with the gradations of the output image data (in the case of L bits (L is an integer higher than or equal to 2), $2^L$ gradations), and $(2^L-1)$ corresponds to the number of dither matrices. According to the screen processing, the thresholds corresponding to the respective pixels of the image data are read out from the respective planes of the dither matrices, and the value of the pixel is compared with the thresholds for the number of planes.

In the case of 16 gradations, a first level to a fifteenth level ((Level 1 to Level 15) are set in the respective dither matrices. When the value of the pixel is higher than or equal to the threshold, the highest value among the levels of the matrix where the threshold is read out is output, and when the value is lower than the threshold, 0 is output. As a result, the density value of each of the pixels of the image data is converted to a 4-bit value. The dither matrices are repeatedly applied in a cycle of the m pixels in a landscape direction and the n pixels in a portrait direction of the image data in a tile manner.

Figure 4:
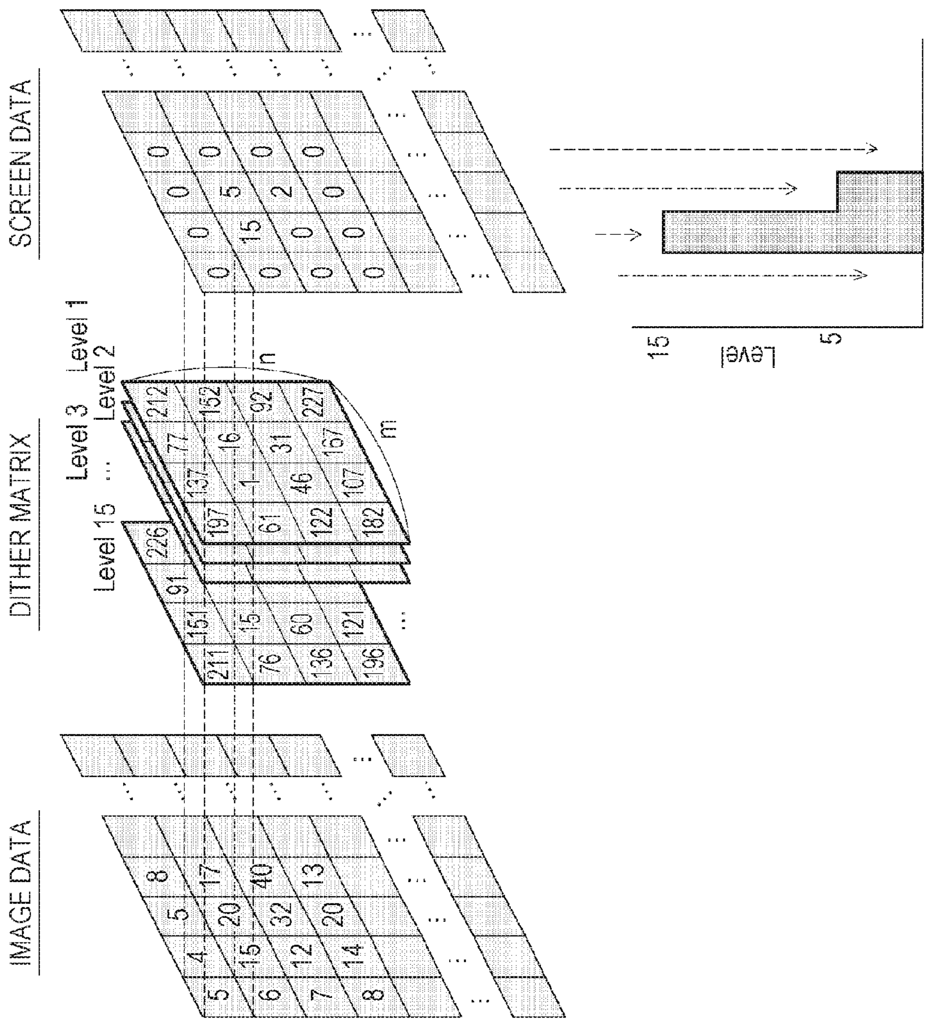
FIG. 4 is an explanatory diagram for describing concentrated-type screen processing.

Herein, as exemplified in FIG. 4, dither matrices where cycles of halftone dots strongly are represented are used as the dither matrices used in the screen processing unit 304. That is, the threshold is assigned such that the halftone dot growth due to the increase in the density value is prioritized over the halftone dot growth due to the area expansion. Then, it may be observed that the adjacent pixels similarly grow in the level direction so that the halftone dots concentrate after one pixel grows to a predetermined level (for example, the maximum level). The thus set dither matrix group has the feature that the tone characteristic is stabilized since the dots concentrate. Hereinafter, the dither matrix group having the above-described feature will be referred to as concentrated-type dither matrices (dot concentrated-type dither matrices). On the other hand, the concentrated-type dither matrices have such a feature that the resolution is low because the patterns of the halftone dots strongly appear. In other words, the concentrated-type dither matrices are the dither matrix group having the high positional dependency of the saving of the density information in which the density information of the pixel before the screen processing may disappear depending on the position of the pixel. For this reason, in a case where the concentrated-type dither matrices are used in the screen processing with respect to a fine object such as a fine line, break of the object or the like is likely to occur.

Figure 5:
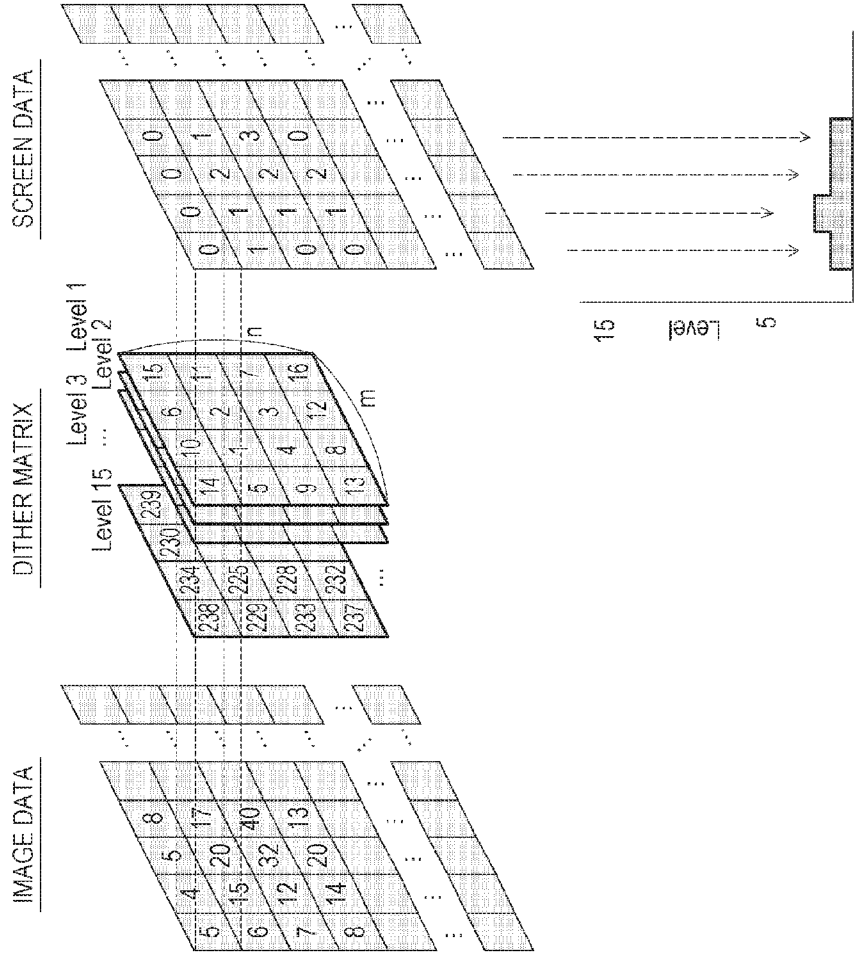
FIG. 5 is an explanatory diagram for describing flat-type screen processing.

On the other hand, as exemplified in FIG. 5, dither matrices where cycles of the halftone dots that are regularly represented hardly appear are used as the dither matrices in the fine line screen processing unit 305. That is, the threshold is assigned such that the halftone dot growth due to the area expansion is prioritized over the halftone dot growth due to the increase in the density value as being different from the dot concentrated-type dither matrices. It may be observed that the pixels in the halftone dots grow so that the area of the halftone dots is increased before one pixel grows to a predetermined level (for example, the maximum level). In the dither matrices, since the periodicity is hardly represented and the resolution is high, it is possible to more accurately reproduce the shape of the object. Hereinafter, the dither matrices will be referred to as flat-type dither matrices (dot flat-type dither matrices). For this reason, as compared with the concentrated-type dither matrices, the flat-type dither matrices are used in the screen processing with respect to a fine object such as a fine line.

That is, according to the present exemplary embodiment, the screen processing based on the flat-type dither matrices (flat-type screen processing) is applied to an object such as a fine line where the shape reproduction is to be prioritized over the color reproduction. On the other hand, the screen processing based on the concentrated-type dither matrices (concentrated-type screen processing) is applied to an object where the color reproduction is to be prioritized.

With Regard to the Fine Line Correction Processing

Next, FIGS. 6 to 11A and 11B, fine line correction processing performed by the fine line correction unit 302 according to the present exemplary embodiment will be described in detail.

When this correction is performed, the fine line correction unit 302 obtains a window image of 5×5 pixels in which an interest pixel set as the processing target is at the center among the CMYK image data stored in the buffer in the color conversion unit 301. Then, the fine line correction unit 302 determines whether or not this interest pixel is a pixel constituting part of the fine line and whether or not this interest pixel is a pixel of the non-fine line part (non-fine line pixels, non-fine line part) and a pixel adjacent to the fine line (hereinafter, will be referred to as a fine line adjacent pixel). Subsequently, the fine line correction unit 302 corrects the density value of the interest pixel in accordance with a result of the determination and outputs the data of the interest pixel where the density value has been corrected to the gamma correction unit 303. The fine line correction unit 302 also outputs the fine line flag for switching the screen processings for the fine line pixels and the pixels other than the fine line to the screen selection unit 306. This is for the purpose of reducing the break or jaggies caused by the screen processing by applying the flat-type screen processing to the pixels of the fine line where the correction has been performed as described above and the corrected fine line adjacent pixels.

Figure 6:
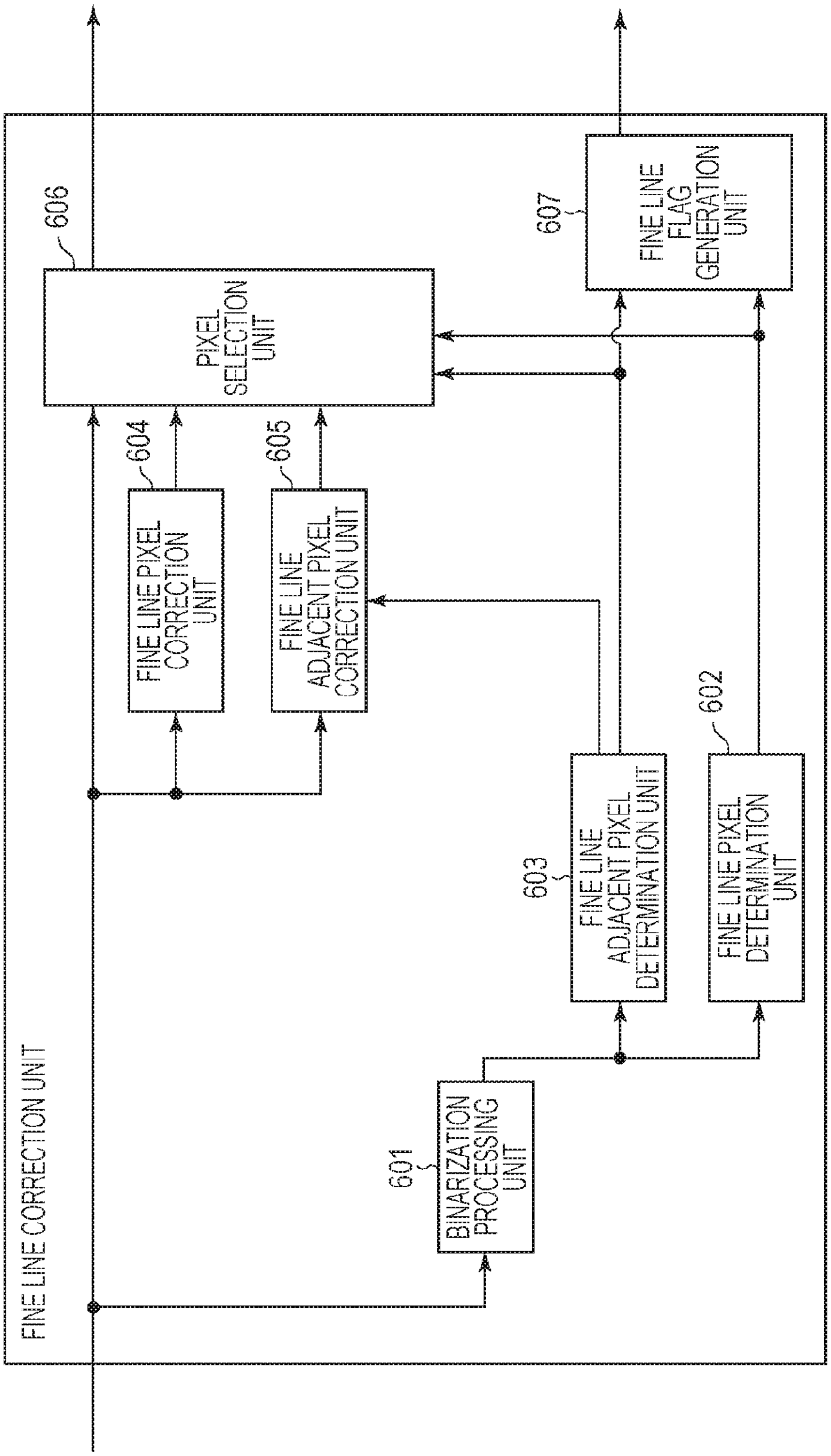
FIG. 6 is a block diagram of a fine line correction unit according to the first exemplary embodiment.
Figure 7:
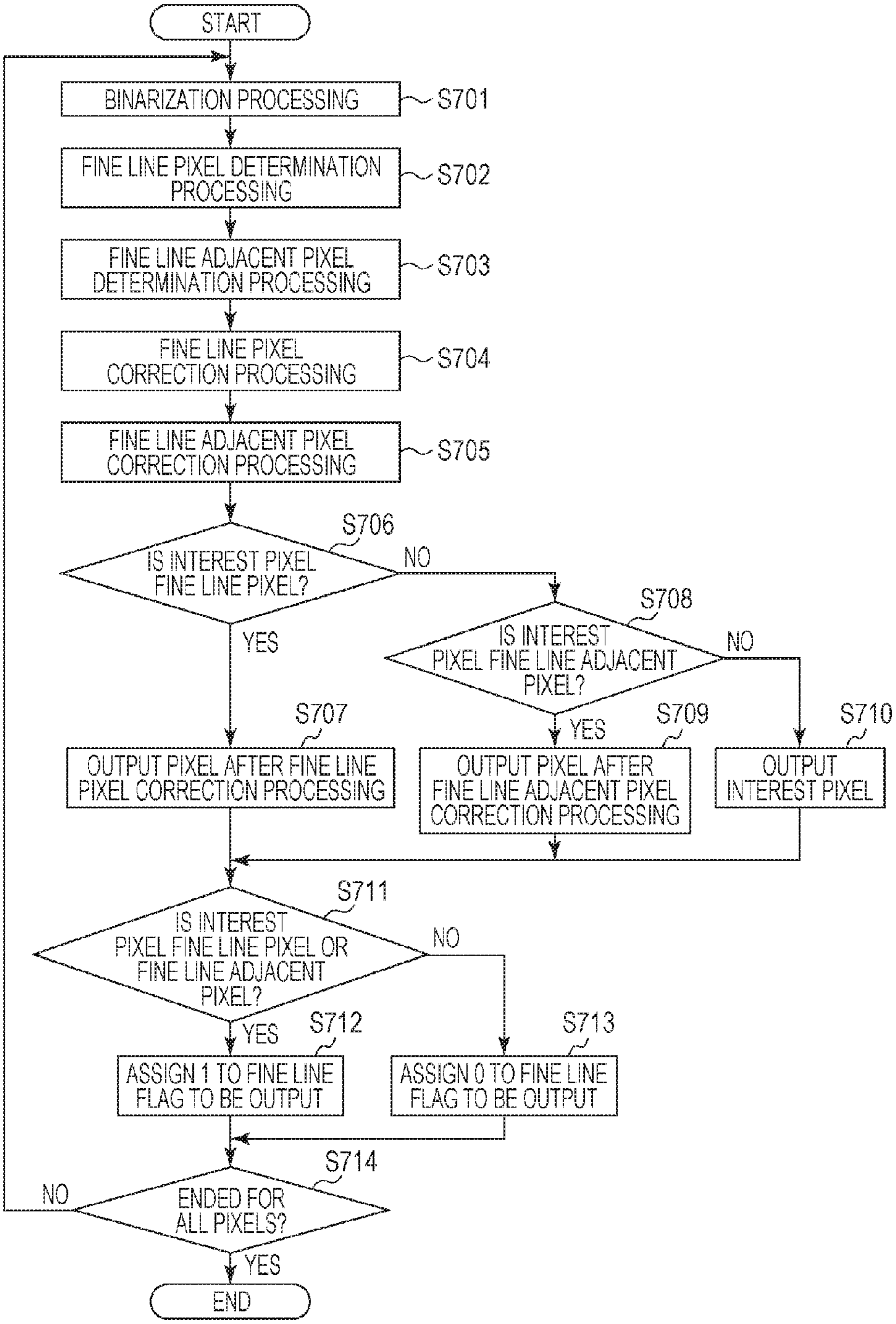
FIG. 7 is a flow chart illustrating a processing procedure of the fine line correction unit according to the first exemplary embodiment.
Figure 8:
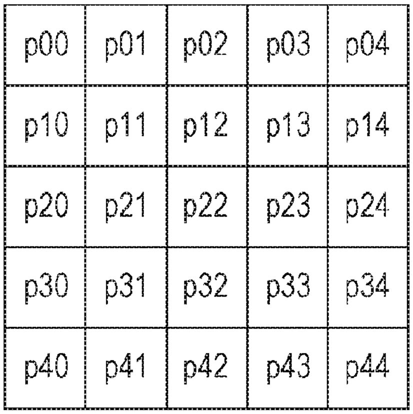
FIG. 8 illustrates an example relationship of an interest pixel with respect to peripheral pixels of a window image having 5×5 pixels.
Figure 9A:
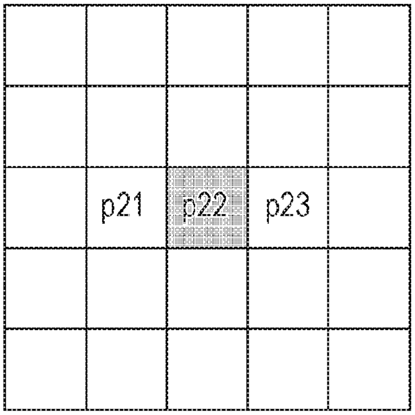
FIGS. 9A and 9B are explanatory diagrams for describing fine line pixel determination processing according to the first exemplary embodiment.
Figure 9B:
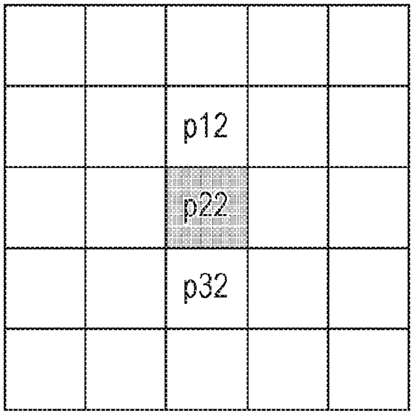

FIG. 6 is a block diagram of the fine line correction unit 302. FIG. 7 is a flow chart equivalent to the fine line correction processing performed by the fine line correction unit 302. FIG. 8 illustrates the 5×5 pixel window including the interest pixel p22 and peripheral pixels input to the fine line correction unit 302. FIGS. 9A and 9B are explanatory diagrams for describing fine line pixel determination processing performed by a fine line pixel determination unit 602. FIGS. 10A to 10D are explanatory diagrams for describing fine line adjacent pixel determination processing performed by a fine line adjacent pixel determination unit 603.

Figure 11A:
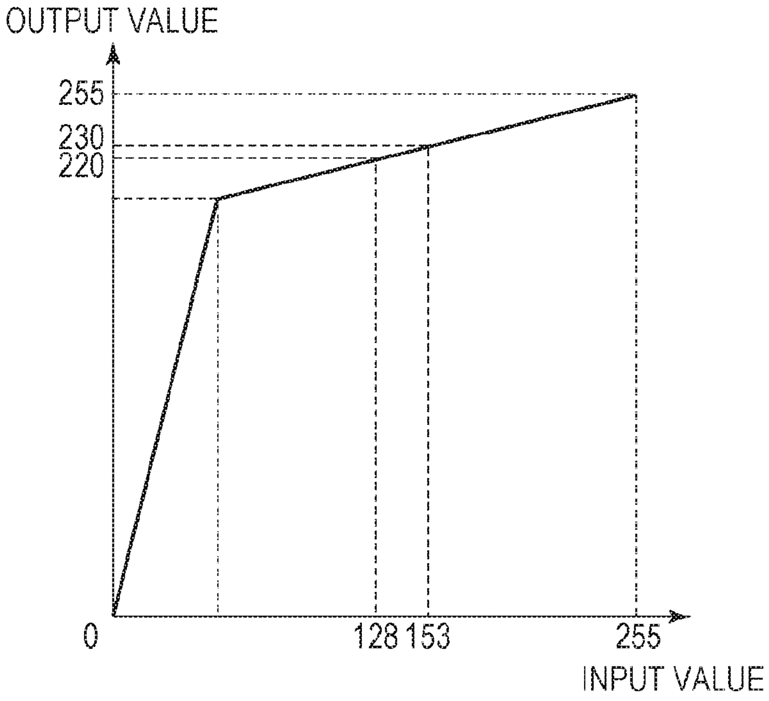
FIGS. 11A and 11B illustrate example correction tables used in the fine line pixel correction processing and the fine line adjacent pixel correction processing according to the first exemplary embodiment.

FIG. 11A illustrates the lookup table for fine line pixel correction processing used in a fine line pixel correction unit 604. The output value is corrected by this lookup table to be higher than or equal to the input value. That is, the fine line pixel is controlled to have a density value higher than the original density value, and the printed fine line is further darkened to improve the visibility as will be described below with reference to FIG. 14B. An inclination of a line segment indicating an input and output relationship of the lookup table with respect to an interval from the input value 0 to an input value lower than 128, which is equivalent to half of a maximum density value 255, exceeds 1. This is because the density value of the fine line pixel is significantly increased to improve the visibility of the low density fine line where the visibility is particularly low.

Figure 11B:
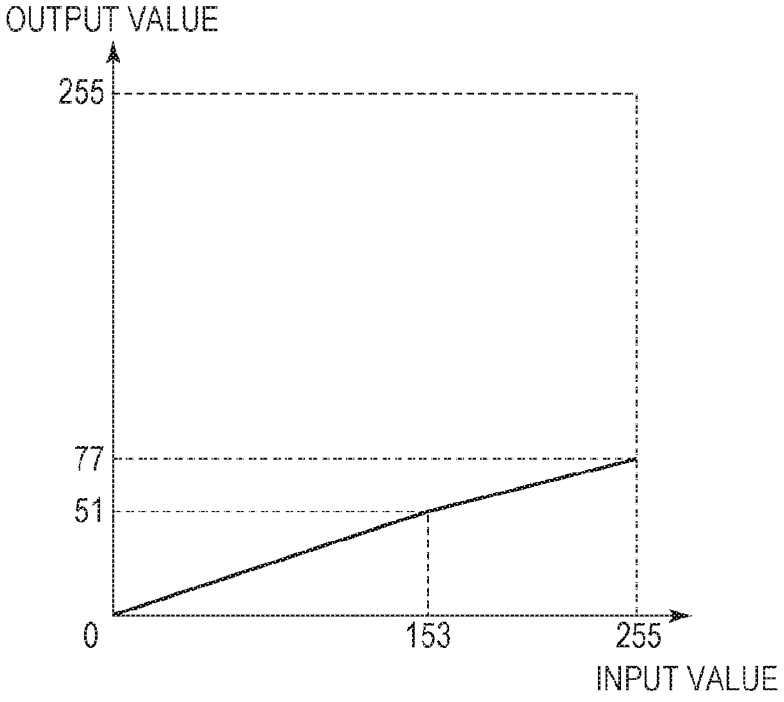

FIG. 11B illustrates the lookup table for fine line adjacent pixel correction processing used in a fine line adjacent pixel correction unit 605. The output value is corrected by this lookup table to be lower than or equal to the input value. That is, the density value of the fine line adjacent pixel is controlled to be the density value lower than or equal to the density value of the fine line pixel, and with regard to the printed fine line, the width of the fine line can be minutely adjusted by taking into account the density of the original fine line as will be described below with reference to FIG. 14B. That is, since the density of the fine line adjacent pixel after the correction does not exceed the density of the original fine line pixel, printing of an edge of the fine line to be unnecessarily darkened (thickened) is avoided. The lookup table predefines an output value corresponding to the minute exposure intensity to such an extent that toner is not adhered to the photosensitive drum. That is, the output value of the lookup table enables the exposure at the exposure intensity where the potential of the exposed part on the photosensitive drum is not lower than a development bias potential Vdc that will be described below. Accordingly, the decrease in the potential of the latent image in the vicinity of the position of the fine line pixel can be minutely controlled, and as a result, it is possible to print the fine line at an appropriate thickness.

It should be noted that, by using the lookup tables of FIGS. 11A and 11B, the respective densities of the pixels of the fine line part and the pixels of the non-fine line part after the correction are determined such that a sum of the respective densities is higher than the density value of the pixels of the fine line part before the correction.

First, in step S701, a binarization processing unit 601 performs binarization processing on the image having the 5×5 pixel window as preprocessing for performing determination processing by the fine line pixel determination unit 602 and the fine line adjacent pixel determination unit 603. The binarization processing unit 601 compares, for example, the previously set threshold with the respective pixels of the window to perform simple binarization processing. For example, in a case where the previously set threshold is 127, the binarization processing unit 601 outputs a value 0 when the density value of the pixel is 64 and outputs a value 1 when the density value of the pixel is 192. It should be noted that the binarization processing according to the present exemplary embodiment is the simple binarization in which the threshold is fixed, but the configuration is not limited to this. For example, the threshold may be a difference between the density value of the interest pixel and the density value of the peripheral pixel. It should be noted that the respective pixels of the window image after the binarization processing are output to the fine line pixel determination unit 602 and the fine line adjacent pixel determination unit 603.

Next, in step S702, the fine line pixel determination unit 602 analyzes the window image after the binarization processing to determine whether or not the interest pixel is the fine line pixel.

As illustrated in FIG. 9A, in a case where the interest pixel p22 of the image after the binarization processing has the value 1 and the peripheral pixel p21 and the peripheral pixel p23 both have the value 0, the fine line pixel determination unit 602 determines that the interest pixel p22 is the fine line pixel. That is, this determination processing is equivalent to pattern matching between the 1×3 pixels where the interest pixel is set as the center (pixels p21, p22, and p23) and a predetermined value pattern (0, 1, and 0).

As illustrated in FIG. 9B, in a case where the interest pixel p22 of the image after the binarization processing has the value 1 and the peripheral pixel p21 and the peripheral pixel p32 both have the value 0, the fine line pixel determination unit 602 determines that the interest pixel p22 is the fine line pixel. That is, this determination processing is equivalent to the pattern matching between the 3×1 pixels where the interest pixel is set as the center (pixels p12 , p22 , and p32 ) and the predetermined value pattern (0, 1, and 0).

When it is not determined that the interest pixel p22 is the fine line pixel, the fine line pixel determination unit 602 outputs the value 1 as the fine line pixel flag to a pixel selection unit 606 and a fine line flag generation unit 607. When it is not determined that the interest pixel p22 is the fine line pixel, the fine line pixel determination unit 602 outputs the value 0 as the fine line pixel flag to the pixel selection unit 606 and the fine line flag generation unit 607.

It should be noted that the interest pixel where the adjacent pixels at both ends do not have density values is determined as the fine line pixel in the above-described determination processing, but determination processing in which a shape of a line is taken into account may be performed. For example, to determine a vertical line, whether or not only the three pixels (p12, p22, and p32) vertically arranged where the interest pixel is set as the center in the 3×3 pixels (p11, p12, p13, p21, p22, p23, p31, p32, and p33) in the 5×5 pixel window have the value 1 may be performed. As an alternative to the above-described configuration, to determine a diagonal line, whether or not only the three pixels (p11, p22, and p33) diagonally arranged where the interest pixel is set as the center in the above-described 3×3 pixels have the value 1 may be performed.

In addition, by analyzing the image of the 5×5 pixel window in the above-described determination processing, a part having a width narrower than or equal to one-pixel width (that is, narrower than two pixels) is specified as the fine line pixel (that is, the fine line part). However, by appropriately adjusting the size of the window and the above-described predetermined value pattern, it is possible to specify a part having a width narrower than or equal to a predetermined width such as a two-pixel width or a three-pixel width (or narrower than a predetermined width) as the fine line part (a plurality of fine line pixels).

Next, in step S703, the fine line adjacent pixel determination unit 603 analyzes the window image after the binarization processing to determine whether or not the interest pixel is a pixel (fine line adjacent pixel) adjacent to a fine line. The fine line adjacent pixel determination unit 603 also notifies the fine line adjacent pixel correction unit 605 of information indicating which peripheral pixel is the fine line pixel by this determination.

Figure 10A:
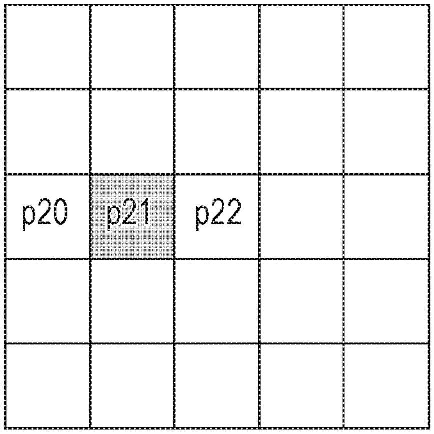
FIGS. 10A to 10D are explanatory diagrams for describing fine line adjacent pixel determination processing according to the first exemplary embodiment.

As illustrated in FIG. 10A, in a case where the interest pixel p22 and the peripheral pixel p20 of the image after the binarization processing have the value 0 and the peripheral pixel p21 has the value 1, the fine line adjacent pixel determination unit 603 determines that the peripheral pixel p21 is the fine line pixel. Then, the fine line adjacent pixel determination unit 603 determines that the interest pixel p22 is the pixel adjacent to the fine line. That is, this determination processing is equivalent to the pattern matching between the 1×3 pixels (pixels p20, p21, and p22 ) where the interest pixel is set as the edge and the predetermined value pattern (pattern of 0, 1, and 0). It should be noted that, in this case, the fine line adjacent pixel determination unit 603 notifies the fine line adjacent pixel correction unit 605 of the information indicating that the peripheral pixel p21 is the fine line pixel.

Figure 10B:
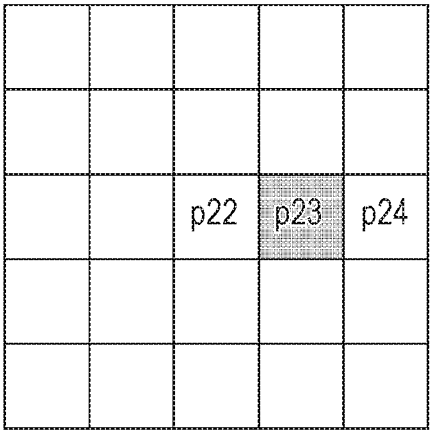

As illustrated in FIG. 10B, in a case where the interest pixel p22 and the peripheral pixel p24 of the image after the binarization processing have the value 0 and the peripheral pixel p23 has the value 1, the fine line adjacent pixel determination unit 603 determines that the peripheral pixel p23 is the fine line pixel. Then, the fine line adjacent pixel determination unit 603 determines that the interest pixel p22 is the pixel adjacent to the fine line. That is, this determination processing is equivalent to the pattern matching between 1×3 pixels (pixels p22, p23, and p24) where the interest pixel is set as the edge and the predetermined value pattern (pattern of 0, 1, and 0). It should be noted that, in this case, the fine line adjacent pixel determination unit 603 notifies the fine line adjacent pixel correction unit 605 of the information indicating that the peripheral pixel p23 is the fine line pixel.

Figure 10C:
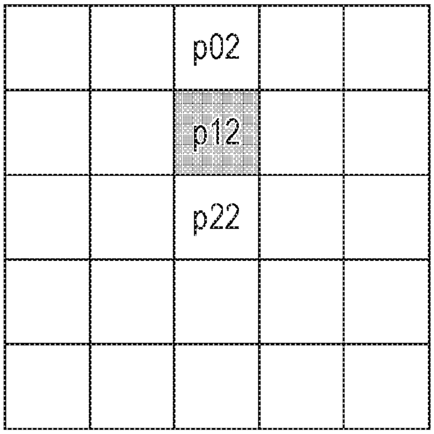

As illustrated in FIG. 10C, in a case where the interest pixel p22 and the peripheral pixel p02 of the image after the binarization processing have the value 0 and the peripheral pixel p12 has the value 1, the fine line adjacent pixel determination unit 603 determines that the peripheral pixel p12 is the fine line pixel. Then, the fine line adjacent pixel determination unit 603 determines that the interest pixel p22 is the pixel adjacent to the fine line. That is, this determination processing is equivalent to the pattern matching between the 3×1 pixels where the interest pixel is set as the edge (pixels p02, p12, p22) and the predetermined value pattern (pattern of 0, 1, and 0). It should be noted that, in this case, the fine line adjacent pixel determination unit 603 notifies the fine line adjacent pixel correction unit 605 of the information indicating that the peripheral pixel p12 is the fine line pixel.

Figure 10D:
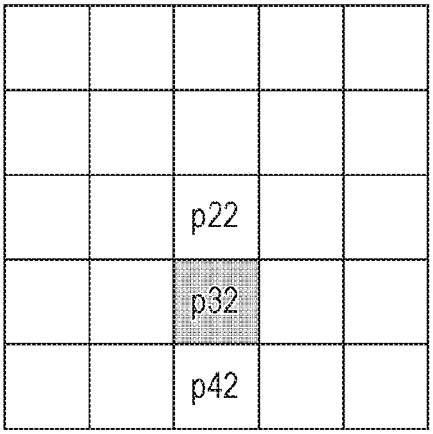

As illustrated in FIG. 10D, in a case where the interest pixel p22 and the peripheral pixel p42 of the image after the binarization processing have the value 0 and the peripheral pixel p32 has the value 1, the fine line adjacent pixel determination unit 603 determines that the peripheral pixel p32 is the fine line pixel. Then, the fine line adjacent pixel determination unit 603 determines that the interest pixel p22 is the pixel adjacent to the fine line. That is, this determination processing is equivalent to the pattern matching between the 3×1 pixels where the interest pixel is set as the edge (pixels p22, p32, and p42) and the predetermined value pattern (pattern of 0, 1, and 0). It should be noted that, in this case, the fine line adjacent pixel determination unit 603 notifies the fine line adjacent pixel correction unit 605 of the information indicating that the peripheral pixel p32 is the fine line pixel.

When it is determined that the interest pixel p22 is the fine line adjacent pixel, the fine line adjacent pixel determination unit 603 outputs the value 1 as the fine line adjacent pixel flag to the pixel selection unit 606 and the fine line flag generation unit 607. When it is not determined that the interest pixel p22 is the fine line adjacent pixel, the fine line adjacent pixel determination unit 603 outputs the value 0 as the fine line adjacent pixel flag to the pixel selection unit 606 and the fine line flag generation unit 607. It should be noted that when it is not determined that the interest pixel p22 is the fine line adjacent pixel, the fine line adjacent pixel determination unit 603 performs notification of information indicating that the default peripheral pixel (for example, p21) is the fine line pixel as dummy information.

It should be noted that the determination processing in which the shape of the line is taken into account may also be performed in this determination processing in S703. For example, to determine a pixel adjacent to the vertical line, whether or not only the three pixels (p11, p21, and p31) vertically arranged where the peripheral pixel p21 adjacent to the interest pixel p22 is set as the center have the value 1 in the 3×3 pixels where the interest pixel within the 5×5 pixel window is set as the center may be performed. As an alternative to the above-described configuration, to determine a pixel adjacent to the diagonal line, whether or not only the three pixels (p10 , p21, and p32) diagonally arranged where the peripheral pixel p21 is set as the center in the above-described the 3×3 pixels have the value 1 may be determined.

Next, in step S704, the fine line pixel correction unit 604 uses the lookup table (FIG. 11A) where the density value of the interest pixel is input to perform first correction processing on the interest pixel. For example, in a case where the density value of the interest pixel is 153, the fine line pixel correction unit 604 determines a density value 230 by the lookup table and corrects the density value of the interest pixel by the determined density value 230. Subsequently, the fine line pixel correction unit 604 outputs the correction result to the pixel selection unit 606. The first correction processing is called processing for correcting the fine line pixel (fine line pixel correction processing).

Next, in step S705, the fine line adjacent pixel correction unit 605 specifies the fine line pixel on the basis of the information that is notified from the fine line adjacent pixel determination unit 603 and indicates which peripheral pixel is the fine line pixel. Then, the lookup table (FIG. 11B) where the density value of the specified fine line pixel is input is used, second correction processing is performed on the interest pixel. Herein, for example, in a case where the density value of the specified fine line pixel is 153, the fine line adjacent pixel correction unit 605 determines a density value 51 by the lookup table and corrects the density value of the interest pixel by the determined density value 51. Subsequently, the fine line adjacent pixel correction unit 605 outputs the correction result to the pixel selection unit 606. The second correction processing is called processing for correcting the fine line adjacent pixel (fine line adjacent pixel correction processing). Herein, when the density value of the fine line adjacent pixel is 0, the fine line adjacent pixel correction unit 605 determines a density value by using the lookup table such that the density value is increased and performs the correction by the determined density value.

Next, in steps S706 and S708, the pixel selection unit 606 selects the density value to be output as the density value of the interest pixel from among the following three values on the basis of the fine line pixel flag and the fine line adjacent pixel flag. That is, one of the original density value, the density value after the fine line pixel correction processing, and the density value after the fine line adjacent pixel correction processing is selected.

In step S706, the pixel selection unit 606 refers to the fine line pixel flag to determine whether or not the interest pixel is the fine line pixel. In a case where the fine line pixel flag is 1, since the interest pixel is the fine line pixel, in step S707, the pixel selection unit 606 selects the output from the fine line pixel correction unit 604 (density value after the fine line pixel correction processing). Then, the pixel selection unit 606 outputs the selected output to the gamma correction unit 303.

On the other hand, in a case where the fine line pixel flag is 0, since the interest pixel is not the fine line pixel, in step S708, the pixel selection unit 606 refers to the fine line adjacent pixel flag to determine whether or not the interest pixel is the fine line adjacent pixel. In a case where the fine line adjacent pixel flag is 1, since the interest pixel is the fine line adjacent pixel, in step S709, the pixel selection unit 606 selects the output from the fine line adjacent pixel correction unit 605 (density value after the fine line adjacent pixel correction processing). Then, the pixel selection unit 606 outputs the selected output to the gamma correction unit 303.

On the other hand, at this time, in a case where the fine line adjacent pixel flag is 0, since the interest pixel is neither the fine line pixel nor the fine line adjacent pixel, in step S710, the pixel selection unit 606 selects the original density value (density value of the interest pixel in the 5×5 pixel window). Then, the pixel selection unit 606 outputs the selected output to the gamma correction unit 303.

Next, in steps S711 to S713, the fine line flag generation unit 607 generates the fine line flag for switching the screen processings in the screen selection unit 306 in a subsequent stage.

In step S711, the fine line flag generation unit 607 refers to the fine line pixel flag and the fine line adjacent pixel flag to determine whether or not the interest pixel is the fine line pixel or the fine line adjacent pixel.

In a case where the interest pixel is the fine line pixel or the fine line adjacent pixel, in step S712, the fine line flag generation unit 607 assigns 1 to the fine line flag to be output to the screen selection unit 306.

In a case where the interest pixel is neither the fine line pixel nor the fine line adjacent pixel, in step S713, the fine line flag generation unit 607 assigns 0 to the fine line flag to be output to the screen selection unit 306.

Next, in step S714, the fine line correction unit 302 determines whether or not the processing is performed for all the pixels included in the buffer of the color conversion unit 301. In a case where the processing is performed for all the pixels, the fine line correction processing is ended. When it is determined that the processing is not performed for all the pixels, the interest pixel is changed to an unprocessed pixel, and the flow is shifted to step S701.

Situation Related to the Image Processing by the Fine Line Correction Unit

Next, with reference to FIGS. 12A to 12D, the image processing performed by the fine line correction unit 302 according to the present exemplary embodiment will be described in detail.

Figure 12A:
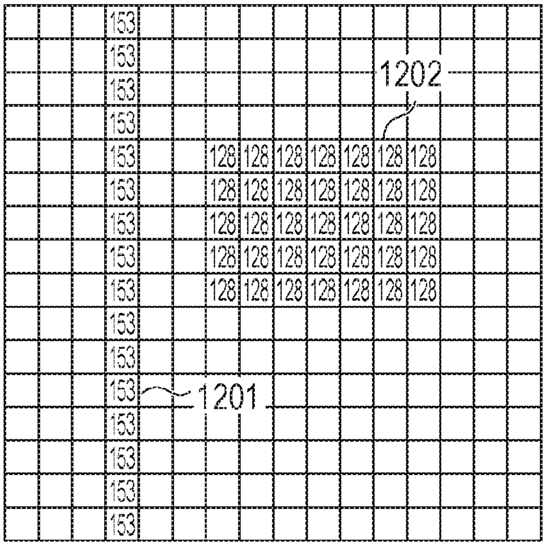
FIGS. 12A to 12D are explanatory diagrams for describing processing of the fine line correction unit according to the first exemplary embodiment.

FIG. 12A illustrates an image input to the fine line correction unit 302 according to the present exemplary embodiment. The image is constituted by a vertical fine line 1201 and a rectangular object 1202. Numeric values in FIG. 12A indicate density values of pixels, and a pixel without a numeric value has a density value 0.

Figure 12B:
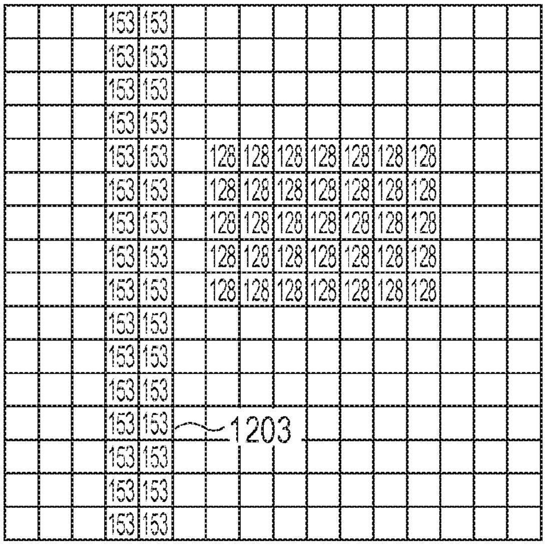

FIG. 12B is a drawing used for performing a comparison with the correction by the fine line correction unit 302 according to the present exemplary embodiment and illustrates an output image in a case where the fine line in the input image illustrated in FIG. 12A is thickened by one pixel on the right. The density value 0 on the right is replaced by the density value 153 of the fine line 1201 to obtain a fine line 1203 having a two-pixel width at the density value 153.

Figure 12C:
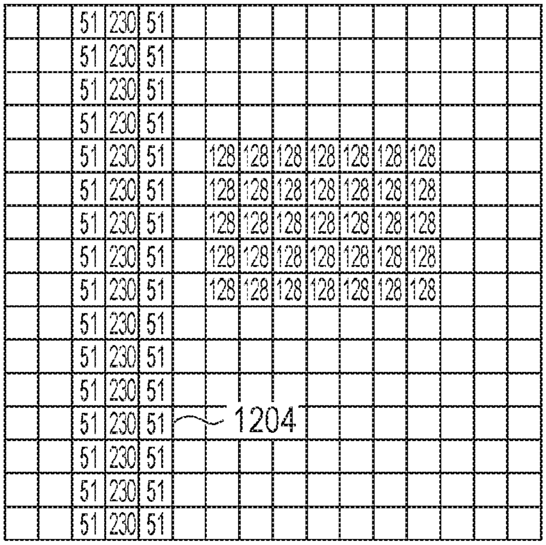

FIG. 12C illustrates an output image of the fine line correction unit 302 according to the present exemplary embodiment. The fine line pixel correction unit 604 corrects the density value of the fine line pixel from 153 to 230 by using the lookup table of FIG. 11A. The fine line adjacent pixel correction unit 605 corrects the density value of the fine line adjacent pixel from 0 to 51 by using the lookup table of FIG. 11B.

Herein, the correction result is set to be higher than the input in the correction table of FIG. 11A with respect to the fine line pixel. That is, the fine line pixel has a higher density than the original density of the fine line pixel. On the other hand, the correction result is set to be lower than the input in the correction table of FIG. 11B with respect to the fine line adjacent pixel. That is, the density value of the fine line adjacent pixel is lower than the original density value of the fine line pixel adjacent thereto. For this reason, the fine line 1201 corresponding to the vertical line having the one-pixel width of the density value 153 illustrated in FIG. 12A is corrected into a fine line 1204 illustrated in FIG. 12C. That is, the relationship concerning the density value of the continuous three pixels of the two fine line adjacent pixels (non-fine line part) sandwiching the fine line pixel and the fine line pixel (fine line part) in the fine line 1204 after the correction is as follows. (1) The center pixel of the continuous three pixels has the density value higher than the density value before the correction as the peak, and also (2) the pixels at both ends of the center pixel have the density value lower than the peak density value after the correction. For this reason, the gravity center of the fine line is not changed before and after the correction, and the density of the fine line can be thickened. In addition, since the exposure at a weak intensity can be overlapped with the fine line pixel as will be described below with reference to FIGS. 14A and 14B while the fine line adjacent pixel is caused to have the density value by the present correction, it is possible to more minutely adjust the line width and the density of the fine line.

It should be noted that the object 1202 is not corrected since the object 1202 is not determined as the fine line.

Figure 12D:
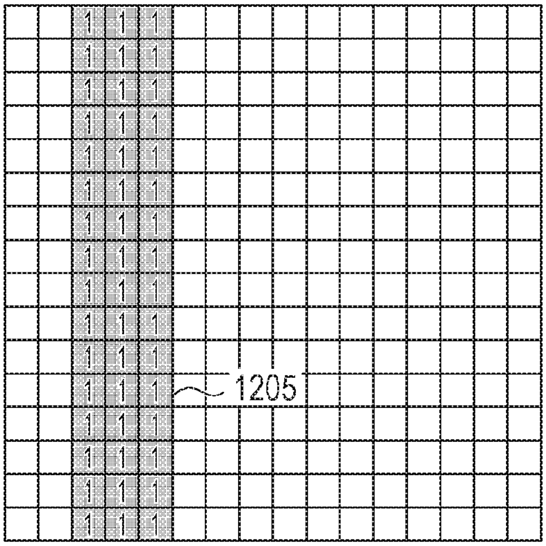

FIG. 12D illustrates an image of the fine line flag of the fine line correction unit 302 according to the present exemplary embodiment. As may be understood from FIG. 12D, the fine line flag 1 is added to the fine line 1204 after the correction, and data in which the fine line flag 0 is added to the other part is output to the screen selection unit 306.

Situation Related to the Screen Processing

Next, with reference to FIGS. 13A to 13E and FIGS. 14A and 14B, the screen processing performed by the image processing unit 105 according to the present exemplary embodiment will be described in detail.

Figure 13A:
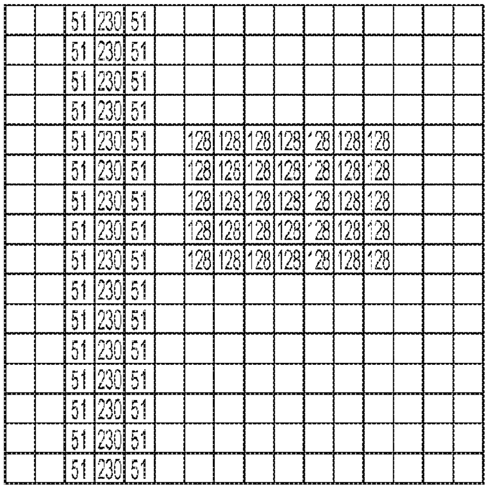
FIGS. 13A to 13E are explanatory diagrams for describing processing of the image processing unit according to the first exemplary embodiment.

FIG. 13A illustrates an output image obtained by executing the fine line correction processing by the fine line correction unit 302. As described above, the gamma correction unit 303 uses the input value as the output value as it is.

Figure 13B:
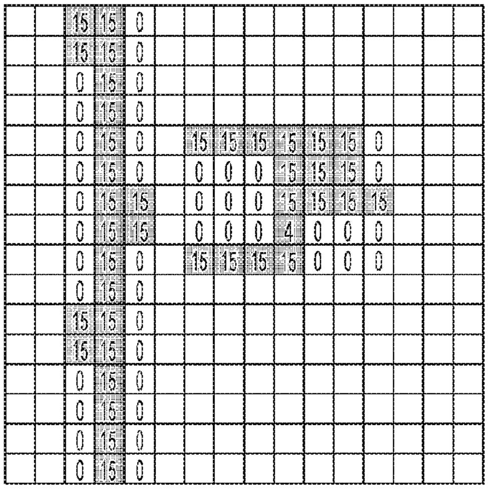

FIG. 13B illustrates an image to which the concentrated-type screen processing has been applied by the screen processing unit 304 while the image of FIG. 13A is set as the input. It may be understood that the fine line largely lacks the adjacent pixels (where the density value is 0).

Figure 13C:
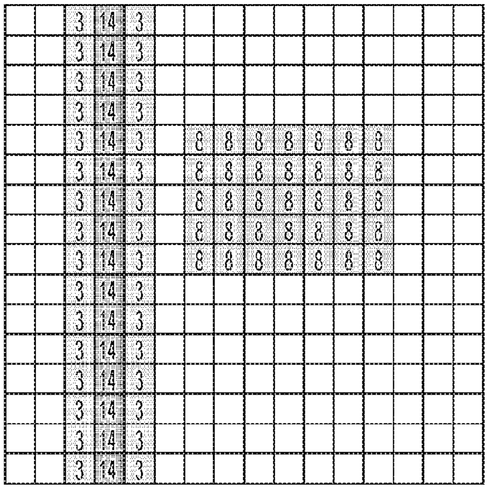

FIG. 13C illustrates an image to which the flat-type screen processing has been applied by the fine line screen processing unit 305 while the image of FIG. 13A is set as the input. It may be understood that the fine line does not lack the adjacent pixels as compared with FIG. 13B.

Figure 13D:
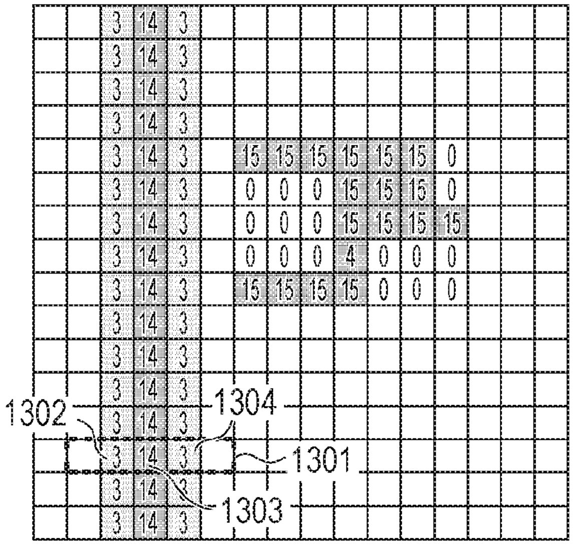

FIG. 13D illustrates a result in the screen selection unit 306 after the fine line pixel or the fine line adjacent pixel selects the pixel of FIG. 13C, and the pixel that is neither the fine line pixel nor the fine line adjacent pixel selects the pixel of FIG. 13B on the basis of the fine line flag of FIG. 12D.

Figure 13E:
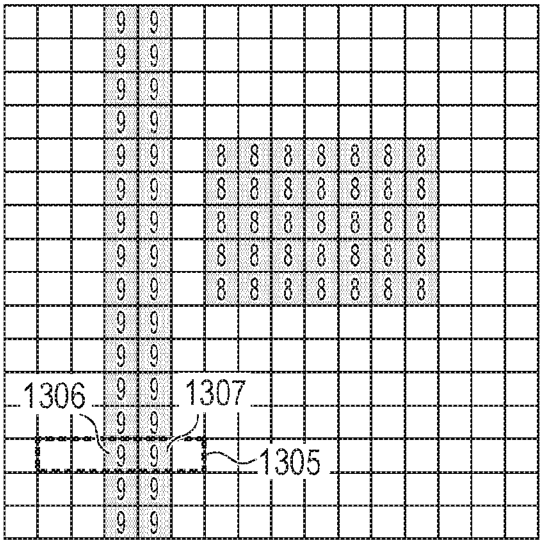

FIG. 13E illustrates an image obtained by applying the flat-type screen processing to the image of FIG. 12B.

Figure 14A:
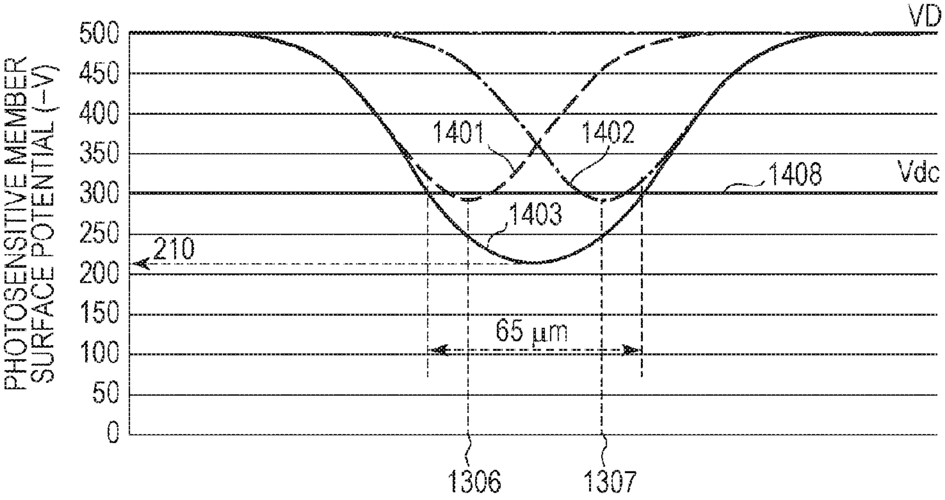
FIGS. 14A and 14B illustrate potentials of a photosensitive member according to the first exemplary embodiment.

FIG. 14A illustrates a situation of the potential on the photosensitive drum in a case where the exposure control unit 201 exposes the photosensitive drum on the basis of the image data 1305 for the five pixels of FIG. 13E. A potential 1401 to be formed by exposure based on image data of a pixel 1306 is indicated by a broken line. A potential 1402 to be formed by exposure based on image data of a pixel 1307 is indicated by a dashed-dotted line. A potential 1403 formed by exposure based on the image data of the two pixels including the pixels 1306 and 1307 is obtained by overlapping (combining) the potential 1401 with the potential 1402. As may be understood from FIG. 14A, exposure ranges (exposure spot diameters) of the mutual adjacent pixels are overlapped with each other. Herein, a potential 1408 corresponds to the development bias potential Vdc by the development apparatus. In the development process, the toner is adhered to the area on the photosensitive drum where the potential is decreased to be lower than or equal to the development bias potential Vdc, and the electrostatic-latent image is developed. That is, the width of the part of the potential 1403 illustrated in FIG. 14A which is higher than or equal to the development bias potential (Vdc) is 65 micrometers, and the toner image is developed at this 65-micrometer width.

Figure 14B:
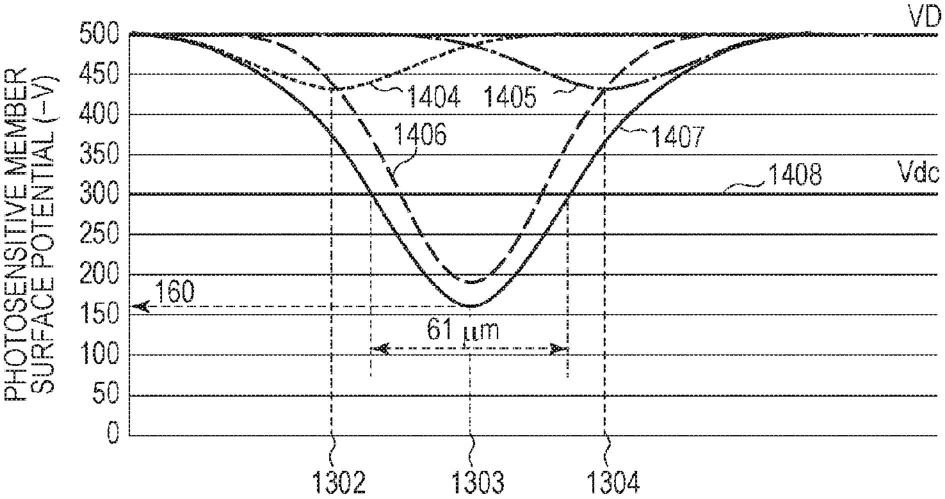

On the other hand, FIG. 14B illustrates a situation of the potential on the photosensitive drum in a case where the exposure control unit 201 exposes the photosensitive drum on the basis of the image data 1301 for the five pixels of FIG. 13D. A potential 1404 to be formed by exposure based on image data of a pixel 1302 is indicated by a dotted line. A potential 1406 to be formed by exposure based on image data of a pixel 1303 is indicated by a broken line. A potential 1405 to be formed by exposure based on image data of a pixel 1304 is indicated by a dashed-dotted line. A potential 1407 formed by exposure based on the image data of the three pixels including the pixels 1302, 1303, and 1304 is obtained by overlapping (combining) the potential 1404, the potential 1405, and the potential 1406 with one another. In this case too, similarly as in FIG. 14A, exposure spot diameters are overlapped with one another among the pixels. In this case too, since the toner is adhered to the area on the photosensitive drum where the potential is decreased to be lower than or equal to the development bias potential Vdc, the toner image having a 61-micrometer width is developed at the potential 1407.

Herein, when FIGS. 14A and 14B are compared with each other, the widths of the developed toner images, that is, the widths of the fine lines are substantially equal to each other. For this reason, also when the method of FIG. 12B (FIG. 13E) (method of copying the density value of the fine line pixel to the density value of the fine line adjacent pixel on its right) is adopted, as illustrated in FIG. 14A, it is possible to minutely adjust the width of the fine line similarly as in the present exemplary embodiment. However, the peak of the potential 1403 of FIG. 14A is −210 V, and on the other hand, the peak of the potential 1407 of FIG. 14B according to the present exemplary embodiment is −160 V. That is, the potential according to the present exemplary embodiment is lower. That is, as compared with the method of FIG. 12B, not only the width of the fine line can be minutely adjusted, but also the thick and clear fine line can be reproduced according to the present exemplary embodiment.

As described above, while the pixels of the fine line part in the image data and the pixels of the non-fine line part adjacent to the fine line part are controlled in accordance with the density of the pixels of the fine line part, both the width and the density of the fine line can be appropriately controlled, and the improvement in the visibility of the fine line can be realized.

In addition, in a case where the fine line is thickened by one pixel on the right as in FIG. 14A, the gravity center of the fine line is shifted towards right. However, according to the present exemplary embodiment, as in FIG. 14B, since the density values of the two non-fine line parts that are adjacent to the fine line part and sandwich the fine line part are controlled to be the same density values, it is possible to control both the width and the density of the fine line without changing the gravity center of the fine line. That is, it is possible to avoid apparent change caused by the gravity center shift due to an orientation of lines constituting line drawings and characters, and the like.

Moreover, the fine line adjacent pixel is set as the pixel adjacent to the fine line, but of course, the density value of the pixel located a further pixel down may also be controlled in accordance with the density value of the fine line pixel by the similar method.

Furthermore, according to the present exemplary embodiment, the example in which monochrome is adopted has been described, but the same also applies to mixed colors. The fine line correction processing may be executed independently for each color. In a case where the correction on an outline fine line is executed independently for each color, if a color plate determined as the fine line and a color plate that is not determined as the fine line exist in a mixed manner, the processing is not applied to the color plate that is not determined as the fine line, and a color may remain in the fine line part. If the color remains, color bleeding occurs. Thus, in a case where at least one color plate is determined as the fine line in the outline fine line correction, the correction processing is to be applied to all the other color plates.

Second Exemplary Embodiment

Hereinafter, image processing according to a second exemplary embodiment will be described.

According to the first exemplary embodiment, the density values of the fine line pixel and the fine line adjacent pixel are corrected in accordance with the density value of the fine line pixel. According to the present exemplary embodiment, descriptions will be given of processing for determining the density value of the fine line adjacent pixel and the density value of the fine line pixel in accordance with a distance between the fine line pixel and another object that sandwich the fine line adjacent pixel. It should be noted that only a difference from the first exemplary embodiment will be described in detail.

Next, the fine line correction processing performed by the fine line correction unit 302 according to the present exemplary embodiment will be described in detail.

Figure 15:
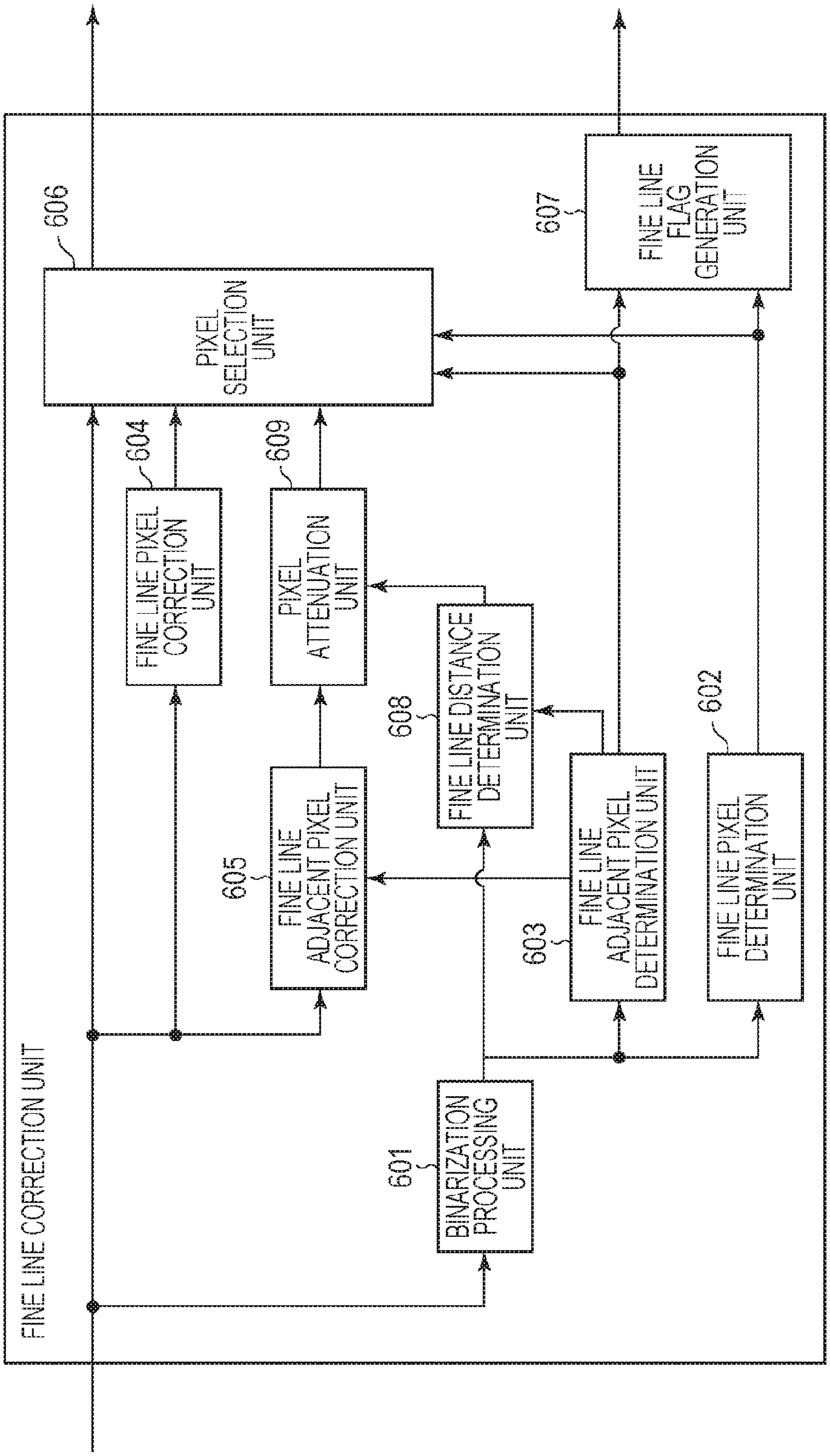
FIG. 15 is a block diagram of the fine line correction unit according to a second exemplary embodiment.
Figure 16:
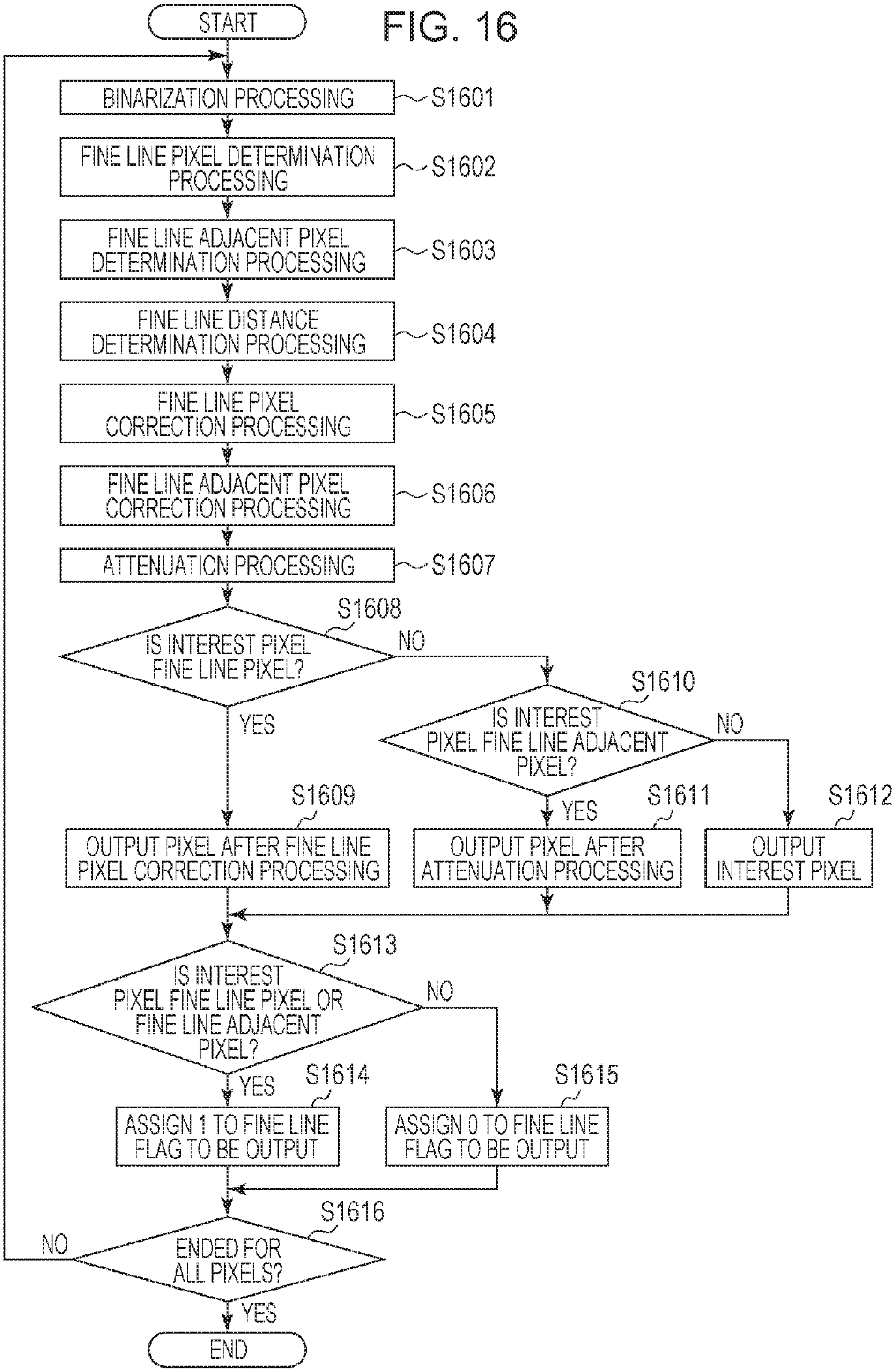
FIG. 16 is a flow chart illustrating a processing procedure of the fine line correction unit according to the second exemplary embodiment.
Figure 17A:
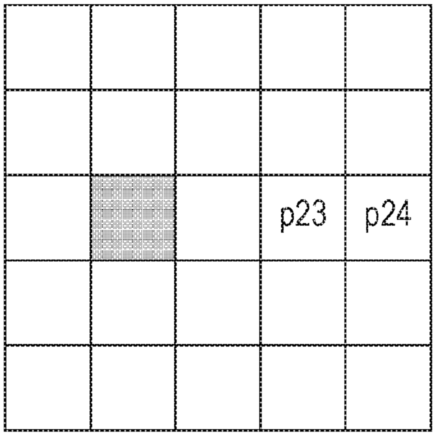
FIGS. 17A to 17D are explanatory diagrams for describing fine line distance determination processing according to the second exemplary embodiment.
Figure 17B:
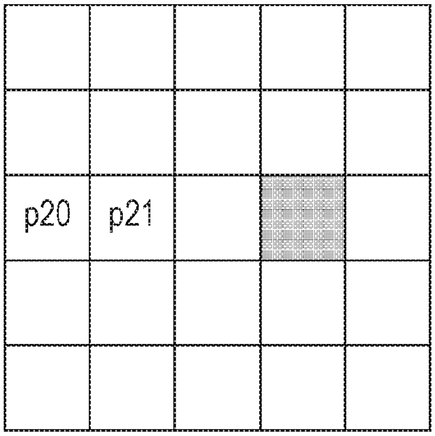
Figure 17C:
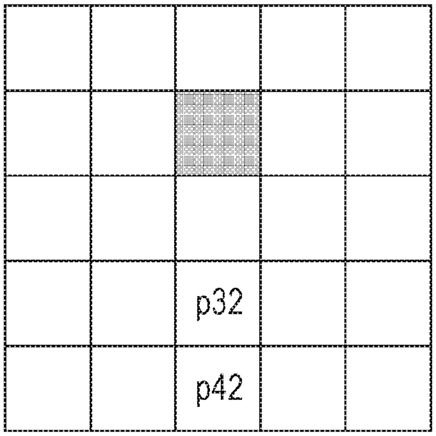
Figure 17D:
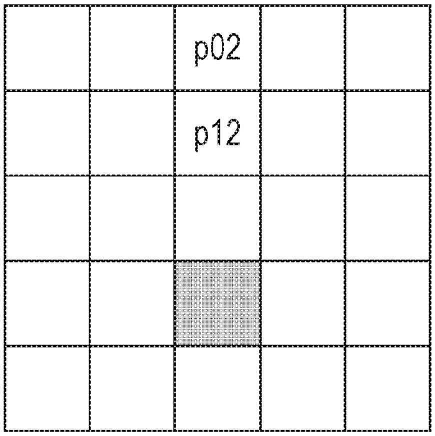
Figure 18:
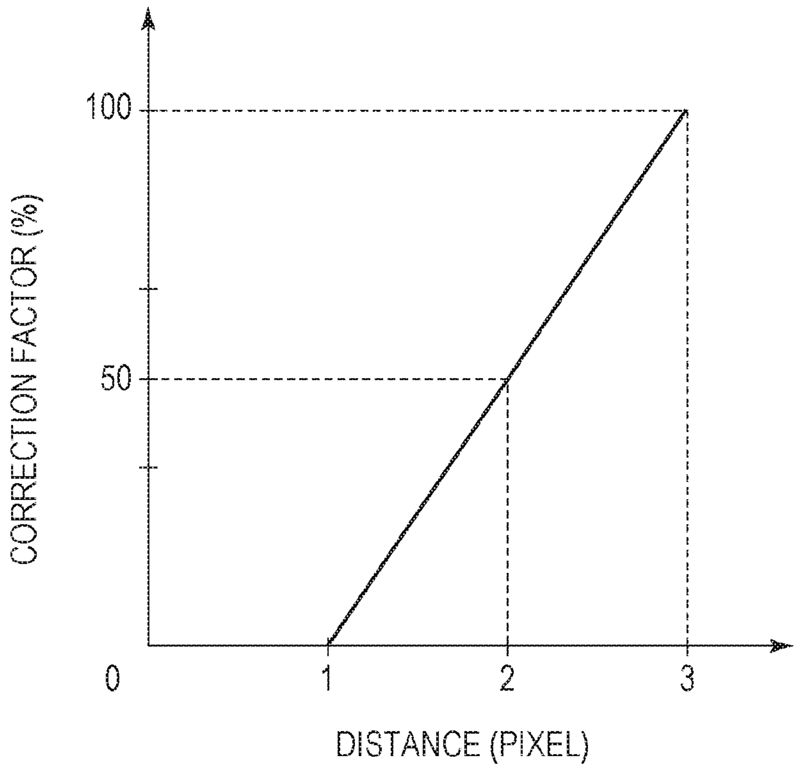
FIG. 18 illustrates an example correction table used in fine line distance determination processing according to the second exemplary embodiment.

FIG. 15 is a block diagram of the fine line correction unit 302, and a difference from the first exemplary embodiment resides in that a fine line distance determination unit 608 is provided. FIG. 16 is a flow chart of the fine line correction processing performed by the fine line correction unit 302. FIGS. 17A to 17D are explanatory diagrams for describing fine line distance determination processing performed by the fine line distance determination unit 608. FIG. 18 illustrates a correction lookup table of fine line adjacent pixel correction processing used by the fine line adjacent pixel correction unit 605.

In step S1601, while the processing similar to step S701 is performed, the binarization processing unit 601 outputs the 5×5 pixel window after the binarization processing to the fine line distance determination unit 608 too.

In step S1602, the fine line pixel determination unit 602 performs processing similar to step S702.

Next, in step S1603, while the fine line adjacent pixel determination unit 603 performs processing similar to step S703, the following processing is also performed. The fine line adjacent pixel determination unit 603 outputs information indicating which peripheral pixel is the fine line pixel to the fine line distance determination unit 608. For example, in the example of FIG. 10A, the information indicating the peripheral pixel p21 is the fine line pixel is input to the fine line distance determination unit 608 by the fine line adjacent pixel determination unit 603.

Next, in step S1604, the fine line distance determination unit 608 determines the distance between the fine line (fine line pixel) and the other object that sandwich the interest pixel on the basis of the information input in step S1603 by referring to the image of the 5×5 pixel window after the binarization processing.

For example, the fine line distance determination unit 608 performs the following processing in a case where the information indicating that the peripheral pixel p21 is the fine line pixel is input. As illustrated in FIG. 17A, the fine line distance determination unit 608 outputs a value 1 as fine line distance information indicating a distance from the fine line pixel to the other object to a pixel attenuation unit 609 in a case where the peripheral pixel p23 in the image after the binarization processing has the value 1. In a case where the peripheral pixel p23 has the value 0 and also the peripheral pixel p24 has the value 1, the fine line distance determination unit 608 outputs a value 2 as the fine line distance information to the pixel attenuation unit 609. In a case where the peripheral pixels p23 and p24 both have the value 0, the fine line distance determination unit 608 outputs a value 3 as the fine line distance information to the pixel attenuation unit 609.

For example, the fine line distance determination unit 608 performs the following processing in a case where the information indicating that the peripheral pixel p23 is the fine line pixel is input. As illustrated in FIG. 17B, the fine line distance determination unit 608 outputs the value 1 as the fine line distance information to the pixel attenuation unit 609 in a case where the peripheral pixel p21 in the image after the binarization processing has the value 1. In a case where the peripheral pixel p21 has the value 0 and also the peripheral pixel p20 has the value 1, the fine line distance determination unit 608 outputs the value 2 as the fine line distance information to the pixel attenuation unit 609. In a case where the peripheral pixels p21 and p20 both have the value 0, the fine line distance determination unit 608 outputs the value 3 as the fine line distance information to the pixel attenuation unit 609.

For example, the fine line distance determination unit 608 performs the following processing in a case where the information indicating that the peripheral pixel p12 is the fine line pixel is input. As illustrated in FIG. 17C, the fine line distance determination unit 608 outputs the value 1 as the fine line distance information indicating the distance from the fine line pixel to the other object to the pixel attenuation unit 609 in a case where the peripheral pixel p32 in the image after the binarization processing has the value 1. In a case where the peripheral pixel p32 has the value 0 and also the peripheral pixel p42 has the value 1, the fine line distance determination unit 608 outputs the value 2 as the fine line distance information to the pixel attenuation unit 609. In a case where the peripheral pixels p32 and p42 both have the value 0, the fine line distance determination unit 608 outputs the value 3 as the fine line distance information to the pixel attenuation unit 609.

For example, the fine line distance determination unit 608 performs the following processing in a case where the information indicating that the peripheral pixel p32 is the fine line pixel is input. As illustrated in FIG. 17D, the fine line distance determination unit 608 outputs the value 1 as the fine line distance information indicating the distance from the fine line pixel to the other object to the pixel attenuation unit 609 in a case where the peripheral pixel p12 in the image after the binarization processing has the value 1. The fine line distance determination unit 608 outputs the value 2 as the fine line distance information to the pixel attenuation unit 609 in a case where the peripheral pixel p12 has the value 0 and also the peripheral pixel p02 has the value 1. The fine line distance determination unit 608 outputs the value 3 as the fine line distance information to the pixel attenuation unit 609 in a case where the peripheral pixels p12 and p02 both have the value 0.

Next, in step S1605, the fine line pixel correction unit 604 performs processing similar to step S704.

Next, in step S1606, the fine line adjacent pixel correction unit 605 performs processing similar to step S705 and inputs the data of the interest pixel (density value) as the processing result to the pixel attenuation unit 609.

Next, in step S1607, the pixel attenuation unit 609 corrects the data (density value) of the interest pixel (fine line adjacent pixel) input from the fine line adjacent pixel correction unit 605 by attenuation processing on the basis of the fine line distance information input from the fine line distance determination unit 608. This attenuation processing will be described.

The pixel attenuation unit 609 refers to the lookup table for the attenuation processing illustrated in FIG. 18 to correct the density value of the interest pixel. The lookup table for the attenuation processing is a lookup table, in which the fine line distance information is used as the input, for obtaining a correction factor used to attenuate the density value of the interest pixel. For example, considerations will be given of a case where the density value of the interest pixel corresponding to the fine line adjacent pixel is 51, and the density value of the fine line pixel adjacent to the interest pixel is 153.

In a case where the input fine line distance information has the value 1, the pixel attenuation unit 609 obtains the correction factor as 0% from the lookup table for the attenuation processing and attenuates the density value of the interest pixel to 0 (=51×0(%)). A purpose of attenuating the density value is to avoid break of a gap between objects caused by the increase in the density value of the fine line adjacent pixel since a distance between the fine line object and the other object is as close as one pixel.

In a case where the input fine line distance information has the value 2, the pixel attenuation unit 609 obtains the correction factor as 50% from the lookup table for the attenuation processing and attenuates the density value of the interest pixel to 25 (=51×50(%)). A reason why the correction factor is set as 50% corresponding to the middle of the range between 0% and 100% herein is that, while the density value of the fine line adjacent pixel is increased, a reduction degree of the gap between the objects caused by the excessive increase in the density value is suppressed. In a case where the input fine line distance information has the value 3, since the correction factor is obtained as 100%, the pixel attenuation unit 609 does not attenuate the density value of the interest pixel and maintains the original density value.

The above-described data (density value) of the interest pixel of the processing result by the pixel attenuation unit 609 is input to the pixel selection unit 606. According to the first exemplary embodiment, the data is directly input from the fine line adjacent pixel correction unit 605 to the pixel selection unit 606, and this aspect is different from the present exemplary embodiment.

In steps S1608, S1609, S1610, and S1612, the pixel selection unit 606 performs processings similar to steps S706, S707, S708, and S710.

It should be noted that, in step S1611, the pixel selection unit 606 selects the output from the pixel attenuation unit 609 (density value after the attenuation processing) to be output to the gamma correction unit 303.

In addition, in steps S1613, S1614, and S1615, the fine line flag generation unit 607 performs processing similar to steps S711, S712, and S713.

Step S1616 is processing similar to S714.

Next, with reference to FIGS. 19A to 19F, the image processing performed by the fine line correction unit 302 according to the present exemplary embodiment will be described in detail.

Figures 19A, 19B, 19C, 19D, 19E, 19F:
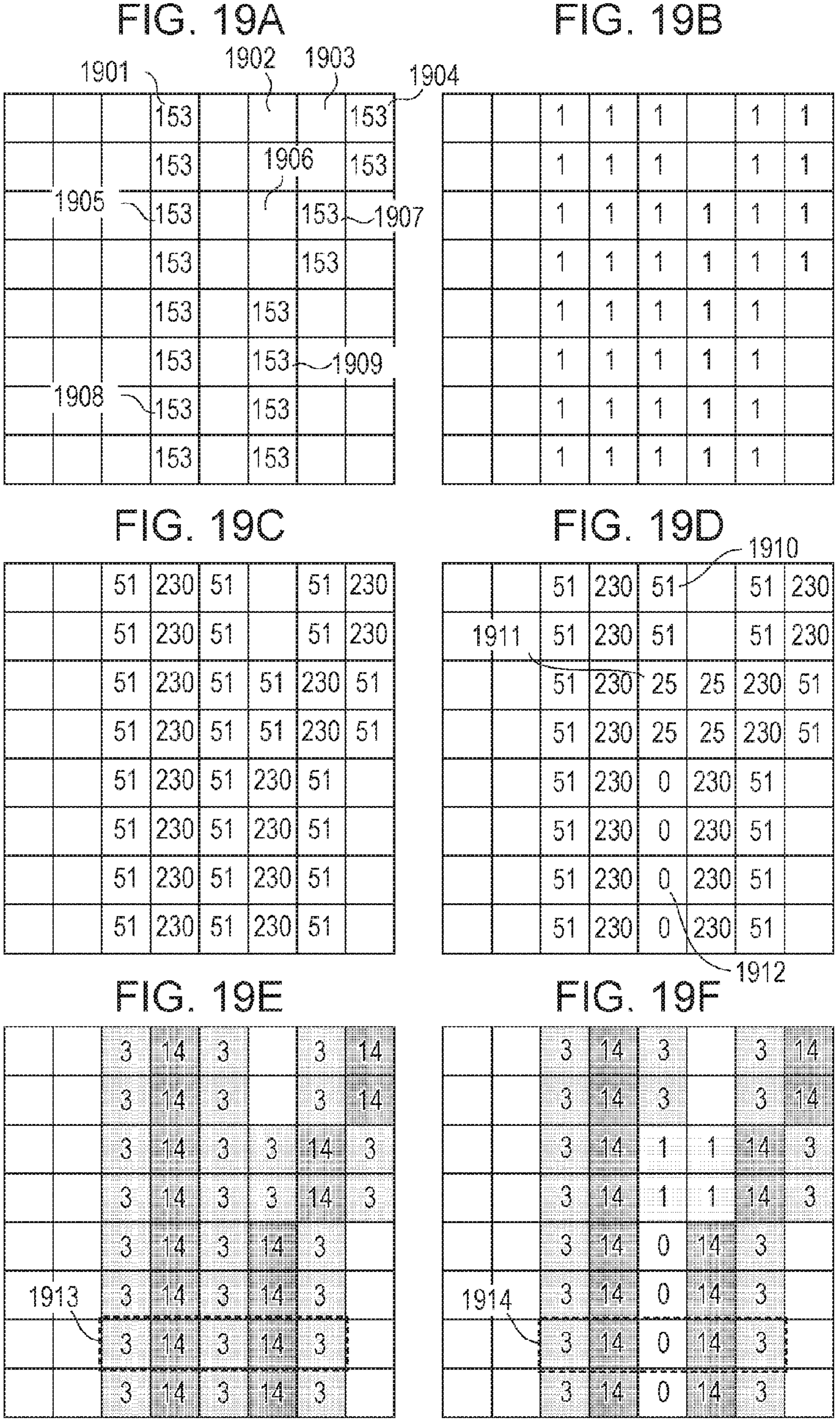
FIGS. 19A to 19F are explanatory diagrams for describing processing of the image processing unit according to the second exemplary embodiment.

FIG. 19A illustrates multi-value image data input to the fine line correction unit 302 according to the present exemplary embodiment.

FIG. 19B illustrates image data indicating the fine line flag output by the fine line correction unit 302 to the screen selection unit 306 according to the present exemplary embodiment.

FIG. 19C illustrates an output image of the fine line correction unit 302 in a case where the attenuation processing is not executed.

FIG. 19D illustrates an output image of the fine line correction unit 302 in a case where the attenuation processing is executed.

FIG. 19E illustrates an image to which the flat-type screen processing has been applied by the fine line screen processing unit 305 in a case where the attenuation processing is not executed.

FIG. 19F illustrates an image to which the flat-type screen processing has been applied by the fine line screen processing unit 305 in a case where the attenuation processing is executed.

A pixel 1910 of FIG. 19D is a fine line adjacent pixel of the fine line pixel 1901 of FIG. 19A. Since the fine line adjacent pixel 1910 is adjacent on the "right" side with respect to the fine line pixel 1901, the fine line distance determination unit 608 performs the determination processing described above with reference to FIG. 17A. The pixel p23 and the pixel p24 illustrated in FIG. 17A correspond to a pixel 1902 and pixel 1903 illustrated in FIG. 19A. Since the density value of each of the pixel 1902 and the pixel 1903 on which the binarization processing has been performed is the value 0, the fine line distance determination unit 608 inputs the value 3 as the fine line distance information to the pixel attenuation unit 609. As a result, the pixel attenuation unit 609 determines the correction factor as 100% and outputs a value 51 as the density value of the pixel 1910 to the pixel selection unit 606. Since the pixel 1910 is the fine line adjacent pixel, the density value 51 is output to the gamma correction unit 303.

A pixel 1911 of FIG. 19D is a fine line adjacent pixel of the fine line pixel 1905 of FIG. 19A. Since the fine line adjacent pixel 1911 is adjacent on the "right" side with respect to the fine line pixel 1905, the fine line distance determination unit 608 performs the determination processing described above with reference to FIG. 17A. The pixel p23 and the pixel p24 illustrated in FIG. 17A correspond to a pixel 1906 and a pixel 1907 illustrated in FIG. 19A. Since the density value of the pixel 1906 on which the binarization processing has been performed is the value 0 and the density value of the pixel 1907 is the value 1, the fine line distance determination unit 608 inputs the value 2 as the fine line distance information to the pixel attenuation unit 609. As a result, the pixel attenuation unit 609 determines the correction factor as 50% and outputs the value 25 as the density value of the pixel 1911 to the pixel selection unit 606. Subsequently, the density value 25 of the pixel 1911 is output to the gamma correction unit 303.

A pixel 1912 of FIG. 19D is a fine line adjacent pixel of the fine line pixel 1908 of FIG. 19A. Since the fine line adjacent pixel 1912 is adjacent on the "right" side with respect to the fine line pixel 1908, the fine line distance determination unit 608 performs the determination processing described above with reference to FIG. 17A. The pixel p23 illustrated in FIG. 17A corresponds to a pixel 1909 illustrated in FIG. 19A. Since the density value of the pixel 1909 on which the binarization processing has been performed is the value 1, the fine line distance determination unit 608 inputs the value 1 as the fine line distance information to the pixel attenuation unit 609. As a result, the pixel attenuation unit 609 determines the correction factor as 0% and outputs the value 0 as the density value of the pixel 1912 to the pixel selection unit 606. Subsequently, the density value 0 of the pixel 1912 is output to the gamma correction unit 303.

Hereinafter, finally, a situation of the potential formed on the photosensitive drum will be described with reference to FIGS. 20A and 20B.

Figure 20A:
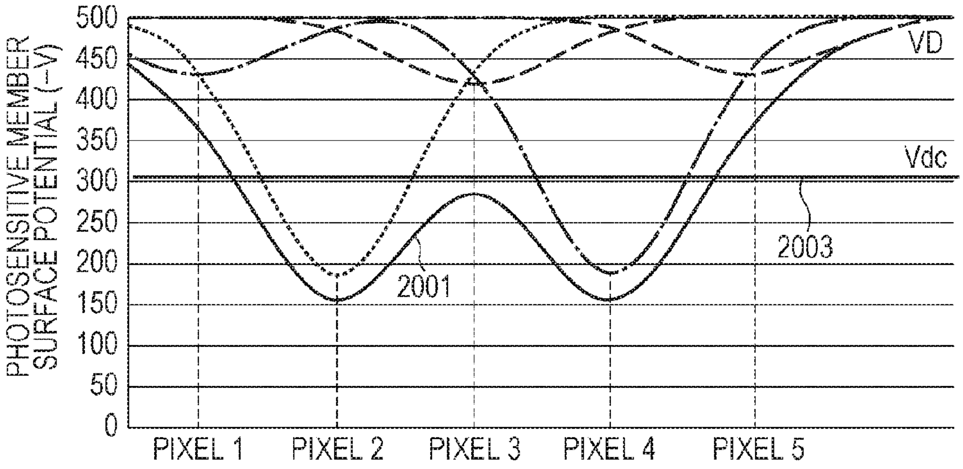
FIGS. 20A and 20B illustrate potentials of the photosensitive member according to the second exemplary embodiment.

FIG. 20A illustrates a situation of the potential on the photosensitive drum in a case where the exposure control unit 201 exposes the photosensitive drum on the basis of image data 1913 for five pixels of FIG. 19E. Five vertical broken lines illustrated in FIG. 20A indicate a position of the pixel center of each of the five pixels of the image data 1913. A potential to be formed on the photosensitive drum in a case where the exposure is performed on the basis of a density value of a pixel 1 (first pixel from the left of the image data 1913) is indicated by a dashed-dotted line having a peak at the position of the pixel 1. Similarly, respective potentials to be formed on the photosensitive drum in a case where the exposure is performed on the basis of density values of pixels 2 to 5 (second to fifth pixels from the left of the image data 1913) are indicated by lines having respective peaks at positions of the pixels 2 to 5.

A potential 2001 formed by the exposure based on the image data 1913 of these five pixels is obtained by overlapping (combining) the five potentials corresponding to the density values of the respective pixel with one another. Herein too, similarly as in the first exemplary embodiment, the exposure ranges (exposure spot diameters) of the mutual adjacent pixels are overlapped with each other. A potential 2003 is the development bias potential Vdc by the development apparatus. In the development process, the toner is adhered to the area on the photosensitive drum where the potential is decreased to be lower than or equal to the development bias potential Vdc, and the electrostatic-latent image is developed. For this reason, since the potential 2001 for the pixels 2 to 4 is decreased to be lower than or equal to the development bias potential Vdc, the toner is adhered to the gap between the two fine lines that have been the separate lines in the original input image, and break of the gap between the lines occurs.

On the other hand, when the attenuation processing according to the present exemplary embodiment is performed, it is possible to avoid the above-described break between the lines. This situation is illustrated in FIG. 20B.

Figure 20B:
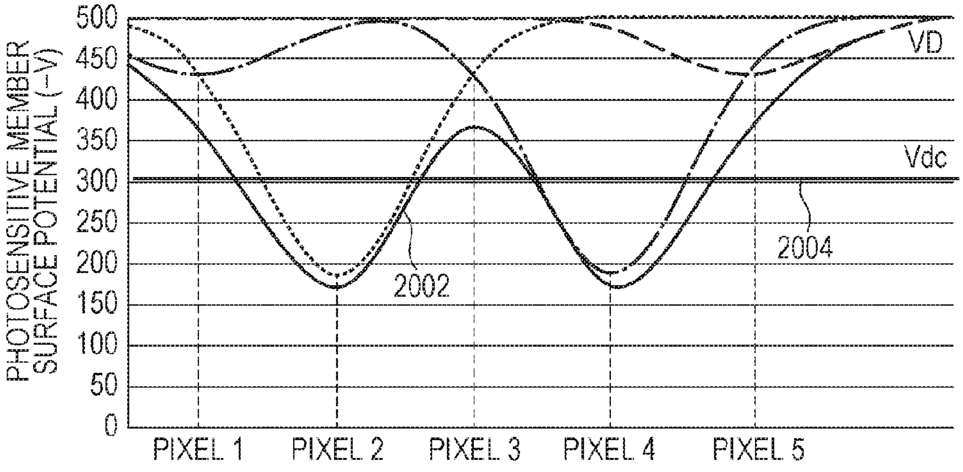

FIG. 20B illustrates the situation of the potential on the photosensitive drum in a case where the exposure control unit 201 exposes the photosensitive drum on the basis of image data 1914 for five pixels of FIG. 19F. Five vertical broken lines illustrated in FIG. 20B indicate a position of the pixel center of each of the five pixels of the image data 1914. A potential to be formed on the photosensitive drum in a case where the exposure is performed on the basis of a density value of the pixel 1 (first pixel from the left of the image data 1914) is indicated by a dashed-dotted line having a peak at the position of the pixel 1. Similarly, potentials to be formed on the photosensitive drum in a case where the exposure is performed on the basis of density values of the pixels 2, 4, and 5 (second, fourth, and fifth pixels from the left of the image data 1914) are indicated by lines having respective peaks at positions of the pixels 2, 4, and 5.

A difference between FIG. 20B and FIG. 20A resides in that the exposure based on the density value of the pixel 3 is not performed. For this reason, a potential 2002 formed by the exposure based on the image data 1914 of these five pixels is obtained by overlapping (combining) four potentials corresponding to the density values of the respective pixels, but the potential 2002 at the position of the pixel 3 is higher than the development bias potential Vdc. As a result, the toner is not adhered to the position of the pixel 3 on the photosensitive drum, and the latent images are developed without the break of the gap between the two lines. As may be understood also from FIG. 20B, when the density value of the pixel 3 is set as 0 while a low density value is added to the pixels 1 and 5 corresponding to the respective fine line adjacent pixels of the two lines, the gravity centers of the respective lines can be slightly separated from each other, and it is possible to further suppress the break of the lines.

As described above, when the density value of the fine line adjacent pixel is adjusted in accordance with the distance between the fine line object and the other object nearest to the fine line object, it is possible to avoid the break caused by the correction while the density of the fine line and the width are appropriately controlled.

Third Exemplary Embodiment

According to the above-described exemplary embodiment, the situation has been described where the black fine line (colored fine line) is drawn in the white background (colorless background) is supposed. That is, the determination and correction of the black fine line in the white background have been described as an example, but the present invention can also be applied to a situation where a white fine line (colorless fine line) is drawn in a black background (colored background) by reversing the determination method of the fine line pixel determination unit 602 and the fine line adjacent pixel determination unit 603. That is, it is possible to perform the determination and correction of the white fine line in the black background. In a case where a one-pixel white fine line is desired to be corrected to a three-pixel white fine line, the output values of the lookup table of FIG. 11B are set as 0 with respect to all of the input values. In a case where the one-pixel white fine line is desired to be corrected to a two-pixel white fine line, the output values of the lookup table of FIG. 11B may be set as 128 (50% of 255) with respect to all of the input values.

When the screen processing is switched for the fine line and other parts, the switching becomes conspicuous in the case of the white fine line. In view of the above, the screen processing is applied to the pixels adjacent to the white fine line instead of the screen processing for the fine line.

The case has been described above where the exposure spot diameters on the photosensitive drum surface are the same for the main scanning and the sub scanning according to the present exemplary embodiment, but the spot diameter on the photosensitive drum surface for the main scanning is not necessarily the same as that for the sub scanning. That is, since the width and density of the fine lines may be different from each other in the vertical fine line and the horizontal fine line, the correction amounts are to be changed in the vertical fine line and the horizontal fine line. In a case where the spot diameter in the vertical fine line is different from that in the horizontal fine line, the fine line pixel correction units 604 are prepared for the vertical fine line and the horizontal fine line, and the correction amount of FIG. 9A is changed from that of FIG. 9B, so that it is possible to control the thicknesses and the densities of the vertical fine line and the horizontal fine line to be the same. The same also applies to the fine line adjacent pixels.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-047632, filed Mar. 10, 2015, which is hereby incorporated by reference herein in its entirety.

What is claimed is:

1. An image forming apparatus comprising:

an obtaining unit that obtains image data;

an identification unit that identifies a fine line part in the image data;

a correction unit that corrects a density value of the fine line part and a density value of a non-fine line part adjacent to the fine line part;

an exposure unit that exposes a photosensitive member based on the image data in which the density values of the fine line part and the non-fine line part have been corrected, wherein an exposure spot corresponding to the fine line part and an exposure spot corresponding to the non-fine line part are overlapped with each other, and a combined potential is formed on the photosensitive member by the exposure spot corresponding to the fine line part and the exposure spot corresponding to the non-fine line part; and an image forming unit that forms an image on the exposed photosensitive member by developing agent adhering on the exposed photosensitive member according to a potential on the exposed photosensitive member formed by the exposure unit, wherein the correction causes a peak of the formed combined potential to reach a target potential and a size of a part of the formed combined potential whose potential is greater than a predetermined potential to reach a target size.

2. The image forming apparatus according to claim 1, wherein the correction for the fine line part increments the density value of the fine line part, the correction for the non-fine line part increments the density value of the non-fine line part, the incremented density value of the non-fine line part corresponding to a minute exposure intensity to such an extent that the developing agent is not adhered to the photosensitive member, the exposure unit forms the combined potential on the photosensitive member by exposing the photosensitive member for the fine line part according to the incremented density value of the fine line part and exposing the photosensitive member for the non-fine line part at the minute exposure intensity according to the incremented density value of the non-fine line part, and the potential for the non-fine line part on the photosensitive member after the formation of the combined potential becomes a potential such that the developing agent adheres to the photosensitive member.

3. The image forming apparatus according to claim 2, wherein a potential for the fine line part on the photosensitive member becomes higher than a potential for the non-fine line part on the photosensitive member in the formed combined potential.

4. The image forming apparatus according to claim 1, wherein the correction for the non-fine line part increments the density value of the non-fine line part, the incremented density value of the non-fine line part corresponding to a minute exposure intensity to such an extent that the developing agent is not adhered to the photosensitive member.

5. The image forming apparatus according to claim 4, wherein the exposure unit forms the combined potential on the photosensitive member by exposing the photosensitive member for the fine line part and the non-fine line part according to the corrected density values of the fine line part and the non-fine line part, a potential for the fine line part becoming higher than a potential for the non-fine line part in the formed combined potential.

6. The image forming apparatus according to claim 5, wherein the exposure unit exposes the photosensitive member at the minute exposure intensity, and the potential for the non-fine line part in the formed combined potential becomes a potential such that the developing agent adheres to the photosensitive member.

7. An image forming apparatus comprising:
an obtaining unit that obtains image data;
an identification unit that identifies a fine line part in the image data;
a determination unit that determines, based on a density value of the identified fine line part, density values for two non-fine line parts that sandwich the fine line part as density values lower than the density value of the fine line part; and
a correction unit that corrects the obtained image data based on the determined density values of the two non-fine line parts.

8. The image forming apparatus according to claim 7, wherein the determination unit determines, based on the density value of the identified fine line part, the density value of the fine line part as a thicker density value, and wherein the correction unit corrects the obtained image data based on the determined density value of the fine line part and the determined density values of the two non-fine line parts.

9. The image forming apparatus according to claim 7, further comprising:
a screen processing unit that performs flat-type screen processing on the fine line part and the two non-fine line parts after the correction.

10. The image forming apparatus according to claim 9, wherein the screen processing unit performs concentrated-type screen processing on the fine line part and a part different from the non-fine line part after the correction.

11. The image forming apparatus according to claim 7, wherein the density values of the two non-fine line parts after the correction are thicker than the density values of the two non-fine line parts before the correction.

12. The image forming apparatus according to claim 7, further comprising:
a distance determination unit that determines a distance between the fine line part and another object that sandwich one of the two non-fine line parts,
wherein the determination unit determines the density value of the one non-fine line part based on the density value of the fine line part and the determined distance.

13. The image forming apparatus according to claim 12, wherein the determination unit determines the density values of the two non-fine line parts as same density values.

14. The image forming apparatus according to claim 7, wherein the identification unit identifies a part having a width narrower than a predetermined width of an image object included in the obtained image data as the fine line part.

15. The image forming apparatus according to claim 7, further comprising:
a printing unit that prints an image on a sheet based on the image data after the correction.

16. The image forming apparatus according to claim 15, wherein the printing unit prints the image on the sheet by an electrophotographic method.

17. The image forming apparatus according to claim 16, wherein the printing unit includes an exposure control unit that exposes a photosensitive member based on the image data after the correction to form an electrostatic-latent image on the photosensitive member, and
wherein ranges exposed by the exposure control unit are partially overlapped with each other in mutual adjacent parts.

18. The image forming apparatus according to claim 7, wherein the image data is multi-value bitmap image data.

19. An image forming method comprising:
obtaining image data;
identifying a fine line part in the obtained image data;
determining, based on a density value of the identified fine line part, density values for two non-fine line parts that sandwich the fine line part as density values lower than the density value of the fine line part; and
correcting the obtained image data based on the determined density values of the two non-fine line parts.

20. The image forming method according to claim 19, wherein the determining determines, based on the density value of the identified fine line part, the density values of the two non-fine line parts as thicker density values but lower than the density value of the fine line part, and
wherein the correcting corrects the obtained image data based on the determined density values of the two non-fine line parts.

21. The image forming method according to claim 20, wherein the determining determines, based on the density value of the identified fine line part, the density value of the fine line part as a thicker density value, and
wherein the correcting corrects the obtained image data based on the determined density value of the fine line part and the determined density values of the two non-fine line parts.

22. A method for image processing for a fine line part included in image data, comprising:
obtaining the image data;
identifying a fine line part in the obtained image data;
increasing a density value of the identified fine line part;
increasing density values of parts that sandwich the identified fine line part, wherein the increased density values of the parts are lower than the increased density value of the identified fine line part, and
printing an image using the image data in which the density value of the identified fine line part and the density values of the parts that sandwich the identified fine line part have been increased.

23. The method according to claim 22, wherein the increased density values of the parts are lower than the original density value of the identified fine line part.

24. The method according to claim 22, wherein the increased density value of the identified fine line part and the increased density values of the parts are dependent on the original density value of the identified fine line part.

25. The method according to claim 22, further comprising:
after the increasing of the density value of the identified fine line part and the increasing of the density values of the parts, performing a screen process on the image data, wherein the screen process generates new image data of N gradations, N being smaller than the number of gradations of the image data.

26. The method according to claim 25, further comprising printing, by a printer, an image including the fine line part based on the new image data.

* * * * *